US012640310B2

(12) United States Patent
Park et al.

(10) Patent No.: US 12,640,310 B2
(45) Date of Patent: May 26, 2026

(54) WIRE STRUCTURE, WIRE CAPACITOR INCLUDING WIRE STRUCTURE, AND ELECTRONIC DEVICE INCLUDING WIRE CAPACITOR

(71) Applicant: Samsung Electronics Co., Ltd., Suwon-si (KR)

(72) Inventors: Soojae Park, Suwon-si (KR); Namhoon Kim, Suwon-si (KR); Jonghyun Lee, Suwon-si (KR); Chul-Hyung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 429 days.

(21) Appl. No.: 18/213,473

(22) Filed: Jun. 23, 2023

(65) Prior Publication Data
US 2024/0021663 A1     Jan. 18, 2024

(30) Foreign Application Priority Data

Jul. 13, 2022     (KR) ........................ 10-2022-0086503
Dec. 23, 2022     (KR) ........................ 10-2022-0183197

(51) Int. Cl.
*H01G 4/28*     (2006.01)
*H01G 4/01*     (2006.01)
*H01G 4/40*     (2006.01)

(52) U.S. Cl.
CPC ................. *H01G 4/28* (2013.01); *H01G 4/01* (2013.01); *H01G 4/40* (2013.01)

(58) Field of Classification Search
None
See application file for complete search history.

(56) References Cited

U.S. PATENT DOCUMENTS

| | | | |
|---|---|---|---|
| 7,227,240 B2 | 6/2007 | Knapp et al. | |
| 8,310,804 B2 | 11/2012 | Takashima et al. | |
| 9,692,386 B2 | 6/2017 | Zuo et al. | |
| 12,080,479 B2 * | 9/2024 | Park ...................... H01G 2/065 | |
| 2010/0284125 A1 | 11/2010 | Moon et al. | |
| 2015/0221592 A1 | 8/2015 | Verma et al. | |
| 2021/0090801 A1 | 3/2021 | Sawada et al. | |
| 2023/0245828 A1 | 8/2023 | Park | |
| 2023/0307180 A1 | 9/2023 | Park | |
| 2023/0319998 A1 | 10/2023 | Park | |

FOREIGN PATENT DOCUMENTS

| | | | | |
|---|---|---|---|---|
| GB | 1062242 A | * | 3/1967 | ......... H01B 11/1895 |
| KR | 10-1738060 B1 | | 5/2017 | |
| KR | 10-1932816 B1 | | 12/2018 | |
| KR | 10-2023-0116281 A | | 8/2023 | |
| KR | 10-2023-0135849 A | | 9/2023 | |
| KR | 10-2023-0139713 A | | 10/2023 | |

* cited by examiner

*Primary Examiner* — Eric W Thomas
(74) *Attorney, Agent, or Firm* — Muir Patent Law, PLLC

(57)     ABSTRACT

A wire capacitor includes a wire structure extending in a longitudinal direction and a conductive layer covering an outer surface of the wire structure. The wire structure includes a core electrode line having a wire shape and extending in the longitudinal direction and a dielectric line surrounding an outer surface of the core electrode line and extending in the longitudinal direction. The wire structure has a first end and a second end which are opposite to each other in the longitudinal direction, and the conductive layer exposes an outer circumference of the first end and the second end of the wire structure.

19 Claims, 25 Drawing Sheets

WCAP

WCAP

WCAP

WIRE STRUCTURE, WIRE CAPACITOR INCLUDING WIRE STRUCTURE, AND ELECTRONIC DEVICE INCLUDING WIRE CAPACITOR

CROSS-REFERENCE TO RELATED APPLICATIONS

This U.S. non-provisional patent application claims priority under 35 U.S.C. § 119 to Korean Patent Application No. 10-2022-0086503, filed on Jul. 13, 2022 and Korean Patent Application No. 10-2022-0183197, filed on Dec. 23, 2022 in the Korean Intellectual Property Office, the entire contents of each of which are hereby incorporated by reference.

BACKGROUND OF THE INVENTION

Aspects of the inventive concept relate to a wire structure, a wire capacitor including the wire structure, and an electronic device including the wire capacitor.

A multi-layer ceramic capacitor (MLCC) used in various electronic devices may have a small size and high capacity, and may be mounted on a substrate using a soldering manner. For example, a multi-layer ceramic capacitor may be mounted on a substrate of an electronic device such as a display device, a computer, and a smartphone, and may be used as a chip-type capacitor that serves to charge or discharge electricity in the electronic device. With miniaturization of electronic devices, miniaturization of the multi-layer ceramic capacitor is also desired. However, due to limitations in manufacturing and mounting processes of multi-layer ceramic capacitors, miniaturization of the multi-layer ceramic capacitors is limited.

SUMMARY

An aspect of the inventive concept is to provide a wire capacitor which is easy to be miniaturized and is capable of adjusting capacitance, and an electronic device including the same.

An aspect of the inventive concept is to provide a wire capacitor which is easily mounted on a substrate and has high integration, and an electronic device including the same.

A wire structure according to some embodiments of the inventive concept may include a core electrode line having a wire shape extending in a longitudinal direction, a dielectric line surrounding an outer surface of the core electrode line and extending in the longitudinal direction, and a passivation line surrounding an outer surface of the dielectric line and extending in the longitudinal direction. The passivation line may contact the outer surface of the dielectric line and includes an insulating material having a lower permittivity than that of the dielectric line.

A wire capacitor according to some embodiments of the inventive concept may include a wire structure extending in a longitudinal direction and a conductive layer covering an outer surface of the wire structure. The wire structure may include a core electrode line having a wire shape and extending in the longitudinal direction and a dielectric line surrounding an outer surface of the core electrode line and extending in the longitudinal direction. The wire structure may have a first end and a second end which are opposite to each other in the longitudinal direction and the conductive layer may expose an outer circumference of the first end and the second end of the wire structure. The wire capacitor may be for use in a semiconductor device or semiconductor module, wherein the conductive layer is configured to be connected to a pad of a substrate, and the first end and the second end of the wire structure each are configured to be bonded to a pad of the substrate.

An electronic device according to some embodiments of the inventive concept may include a substrate and a wire capacitor electrically connected to the substrate. The wire capacitor may include a wire structure extending in a longitudinal direction and a conductive layer covering an outer surface of the wire structure. The wire structure may include a core electrode line having a wire shape and extending in the longitudinal direction and a dielectric line surrounding an outer surface of the core electrode line and extending in the longitudinal direction. The wire structure may include a first end and a second end opposite to each other in the longitudinal direction and the conductive layer may expose an outer circumference of the first end and the second end of the wire structure. The core electrode line may be connected to the substrate by a wire bonding manner, at at least one of the first end and the second end of the wire structure. The conductive layer may be electrically connected to the substrate.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 5 is a cross-sectional view taken along the line A-A' of FIG. 4.

FIG. 14 is a diagram showing a wire capacitor according to some embodiments of the inventive concept and is a cross-sectional view taken along the line A-A' of FIG. 11.

FIG. 25 is a cross-sectional view taken along the line A-A' of FIG. 24.

FIGS. 29 to 33 are cross-sectional views of electronic devices including a wire capacitor according to embodiments of the inventive concept.

DETAILED DESCRIPTION

Hereinafter, the inventive concept is described in detail by explaining the embodiments of the inventive concept with reference to the accompanying drawings.

Figure 1:
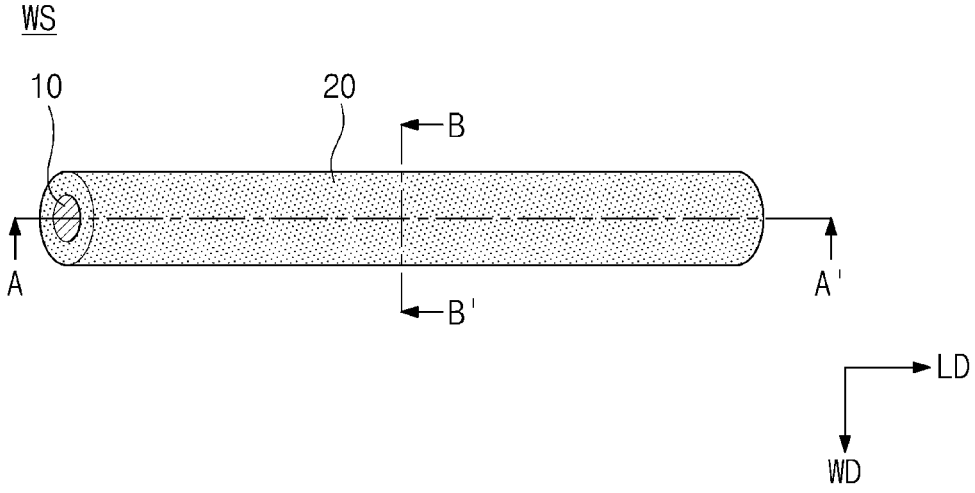
FIG. 1 is a schematic perspective view of a wire structure according to some embodiments of the inventive concept.
Figure 2:
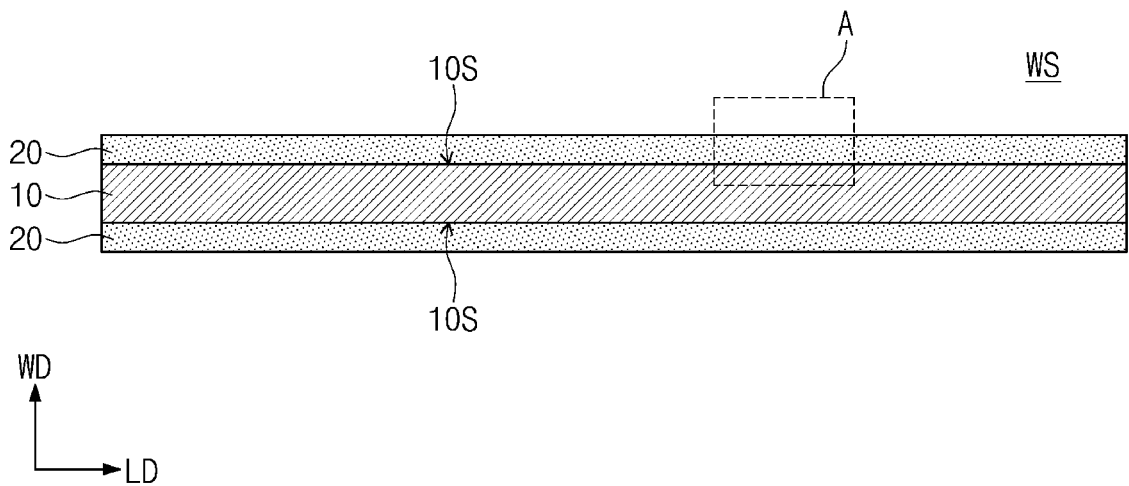
FIG. 2 is a cross-sectional view taken along the line A-A' of FIG. 1.
Figure 3A:
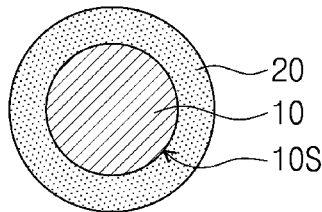
FIG. 3A is a cross-sectional view taken along the line B-B' of FIG. 1.
Figure 3B:
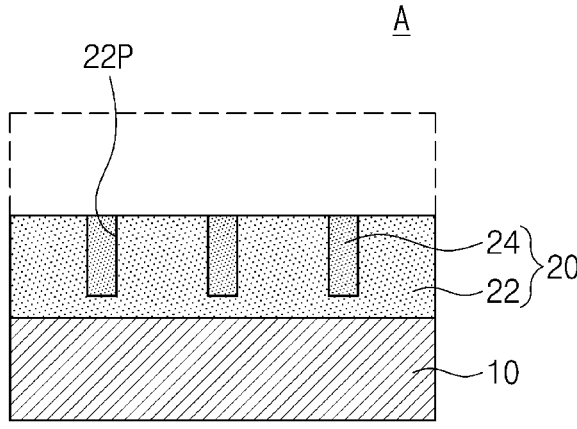
FIG. 3B is an enlarged diagram of part 'A' of FIG. 2.

FIG. 1 is a schematic perspective view of a wire structure according to some embodiments of the inventive concept. FIG. 2 is a cross-sectional view taken along the line A-A' of FIG. 1. FIG. 3A is a cross-sectional view taken along the line B-B' of FIG. 1, FIG. 3B is an enlarged diagram of part 'A' of FIG. 2.

Referring to FIGS. 1, 2 and 3A, a wire structure WS may include a core electrode line 10 and a dielectric line 20 surrounding an outer surface 10S of the core electrode line 10.

The core electrode line 10 may have a wire shape extending lengthwise in one direction. An item, layer, or portion of an item or layer described as extending "lengthwise" in a particular direction has a length in the particular direction and a width perpendicular to that direction, where the length is greater than the width. The one direction may be referred as a first direction, or a longitudinal direction LD, and a direction perpendicular to the longitudinal direction LD may be referred as a second direction, or width direction WD. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim). As shown in FIG. 3A, the core electrode line 10 may have a round shape (e.g., a circle) in a cross section in the width direction WD. According to other embodiments, unlike that illustrated in FIG. 3A, the core electrode line 10 may have a polygonal shape in a cross section in the width direction WD. The core electrode line 10 may include or be formed of a first metal, and the first metal may include or may be at least one of Au, Ag, Pd, Cu, and Al for an example.

The dielectric line 20 may surround an outer surface 10S of the core electrode line 10, and may extend in the longitudinal direction LD along the outer surface 10S of the core electrode line 10. The dielectric line 20 may include or be formed of a dielectric material, and may be a ceramic material (e.g., $Al_2O_3$) as an example.

Referring to FIG. 3B, according to some embodiments, the dielectric line 20 may include a sub-dielectric line 22 including a porous structure having a plurality of holes 22P and dielectric patterns 24 filling the plurality of holes 22P.

The dielectric patterns 24 may include a different dielectric material from that of the sub-dielectric line 22. The sub-dielectric line 22 may include a first dielectric material, and the dielectric patterns 24 may include a second dielectric material having a higher permittivity than that of the first dielectric material. A dielectric constant of the second dielectric material may be larger than a dielectric constant of the first dielectric material. The first dielectric material may include or be a metal oxide, and may include or be at least one of, for example, aluminum oxide, titanium oxide, niobium oxide, yttrium oxide, tantalum oxide, cobalt oxide, zirconium oxide, barium oxide, hafnium oxide, barium titanate, manganese oxide, ruthenium oxide, or manganese carbonate, or may be a multi-component oxide containing elements constituting the oxide described above. The second dielectric material may include or be a material having a higher dielectric constant than that of the first dielectric material, and may include or be at least one of, for example, aluminum oxide, titanium oxide, niobium oxide, yttrium oxide, tantalum oxide, cobalt oxide, zirconium oxide, barium oxide, hafnium oxide, barium titanate, manganese oxide, ruthenium oxide, or manganese carbonate, or may be a multi-component oxide containing elements constituting the oxide described above. The sub-dielectric line 22 and dielectric patterns 24 may be described as first dielectric line portion and second dielectric line portion. For example, the first dielectric line portion may include holes, and the second dielectric line portion may fill the holes. The holes 22P may extend partially into the sub-dielectric line 22 so that the dielectric patterns 24 contact a surface of the sub-dielectric line 22 at an innermost surface of the dielectric patterns 24 and are exposed with respect to the sub-dielectric line 22 at an outermost surface of the dielectric patterns 24. The holes 22P may be, for example, cylindrical holes having a substantially circular diameter, or may be more elongated around part of the circumference of the dielectric line 20. The holes 22P may be arranged both in a longitudinal direction as depicted in FIG. 3B, and in a circumferential direction around the core electrode line 10.

Referring to FIGS. 1, 2 and 3A, according to some embodiments, the dielectric line 10 may contact the outer surface 10S of the core electrode line 10. The wire structure WS may not include an additional electrode. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element (or using any form of the word "contact"), there are no intervening elements present at the point of contact.

Hereinafter, an example manufacturing method of the wire structure WS is described.

Referring to FIGS. 1, 2, and 3A, forming the wire structure WS may include, for example, providing the core electrode line 10 having the wire shape, and depositing the dielectric line 20 on the outer surface 10S of the core electrode line 10. The depositing of the dielectric line 20 may be performed by, for example, a physical vapor deposition method, a chemical vapor deposition method, or an atomic layer deposition method.

Referring to FIG. 3B, according to some embodiments, forming the wire structure WS may include providing the core electrode line 10 having the wire shape, forming the sub-dielectric line 22 that surrounds the outer surface 10S of the core electrode line 10 and has the porous structure including the plurality of holes 22P, and forming the dielectric patterns 24 filling the plurality of holes 22P.

For example, forming the sub-dielectric line 22 may include forming a metal layer surrounding the outer surface 10S of the core electrode line 10, and oxidizing the metal layer using an anodizing process. The metal layer may include, for example, an aluminum, and may be formed by a physics vapor deposition method, a chemical vapor deposition method, or an atomic layer deposition method. As the metal layer is oxidized by the anodizing process, the plurality of holes 22p may be formed in the sub-dielectric line 22.

Forming the dielectric patterns 24 may include, for example, forming a dielectric layer filling the plurality of holes 22P on the sub-dielectric line 22, and removing a portion of the dielectric layer to expose the surface of the sub-dielectric line 22. Removing the portion of the dielectric layer may be performed, for example, using a dry or wet etching process. Remaining portions of the dielectric layer may remain in the plurality of holes 22p, and may constitute the dielectric patterns 24.

Figure 4:
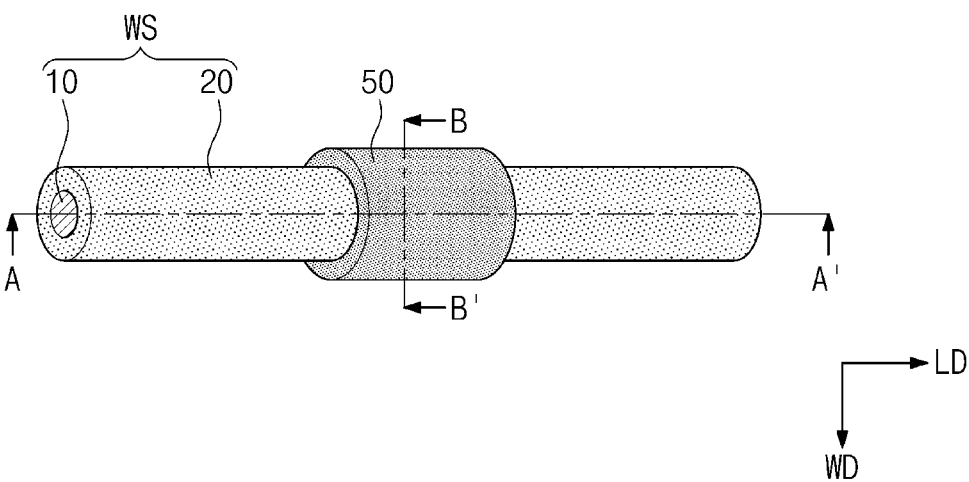
FIG. 4 is a schematic perspective view of a wire capacitor according to some embodiments of the inventive concept.
Figure 5:
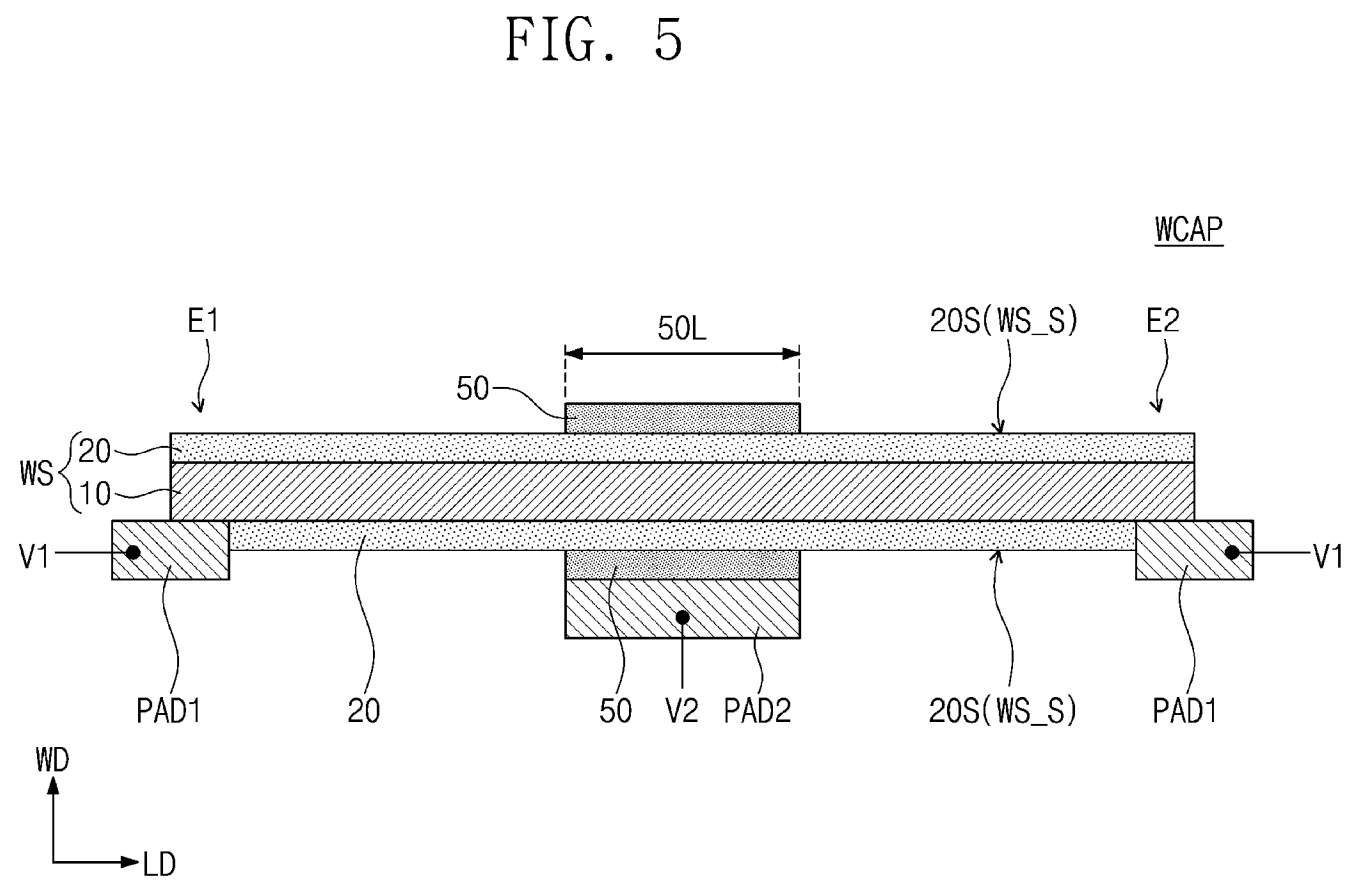

FIG. 4 is a schematic perspective view of a wire capacitor according to some embodiments of the inventive concept. FIG. 5 is a cross-sectional view taken along the line A-A' of FIG. 4, and FIG. 6 is a cross-sectional view taken along the line B-B' of FIG. 4.

Figure 6:
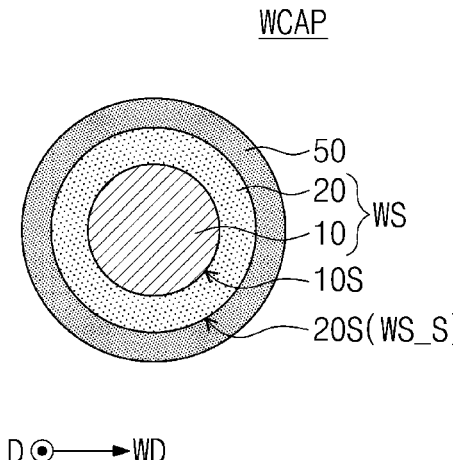
FIG. 6 is a cross-sectional view taken along the line B-B' of FIG. 4.

Referring to FIGS. 4 to 6, a wire capacitor WCAP may include a wire structure WS and a conductive layer 50 covering an outer surface WS_S of the wire structure WS. The wire structure WS may be described as an insulated wire or a dielectric-covered wire. According to some embodiments, the wire structure WS may be the wire structure WS described with reference to FIGS. 1, 2, 3A and 3B. The wire structure WS may have a wire shape that extends in the longitudinal direction LD, and may include a first end E1 and a second end E2 that are opposite to each other in the longitudinal direction LD. The outer surface of the wire structure WS may correspond to the outer surface 20S of the dielectric line 20.

The conductive layer 50 may expose (e.g., may not cover or contact) the first end E1 and the second end E2 of the wire structure WS. For example, the conductive layer 50 may expose an outer circumference of the wire structure WS at the first end E1 and second end E2. The conductive layer 50 may cover the outer surface 20S of the dielectric line 20, and contact the dielectric line 20. According to some embodiments, the conductive layer 50 function as an outer electrode of the wire capacitor WCAP. As a length 50L (e.g., a length in the longitudinal direction LD) of the conductive layer 50 is adjusted, a capacitance of the wire capacitor WCAP may be adjusted. The conductive layer 50 may include or be formed of a conductive paste (e.g., Ag paste or solder paste), for example.

The wire capacitor WCAP may be connected to pads PAD1, PAD2 disposed on the substrate described later. According to some embodiments, ends of the core electrode line 10 may be connected to a pair of first pads PAD1 of the pads PAD1 and PAD2, respectively, at the first end E1 and the second end E2 of the wire structure WS. The ends of the core electrode line may be electrically connected to the pair of first pads PAD1, respectively using a wire bonding manner, at the first end E1 and the second end E2 of the wire structure WS. For example, one end of the core electrode line 10 may be connected to one of the pair of first pads PAD1 using a ball bonding manner or a wedge bonding manner, at the first end E1 of the wire structure WS. The other end of the core electrode line 10 may be connected to the other one of the pair of first pads PAD1 using a ball bonding manner or a wedge bonding manner, at the second end E2 of the wire structure WS. As shown in FIG. 5, in some embodiments, a piece of the dielectric material that forms the dielectric line 20 may be removed or omitted where the core electrode line 10 electrically connects to the pair of first pads PAD1. The first end E1 and second end E2 may each be of a size that allows the ends to be bonded to a pad formed on a substrate associated with a semiconductor device (e.g., a substrate such as a package substrate, a circuit board, etc.), so that each end is configured to connect to such a pad. A region where the conductive layer 50 is formed may also be of a size that allows the conductive layer 50 to be connected to (e.g., bonded to) a pad formed on the substrate, so that the conductive layer 50 is configured to be connected to such a pad.

A first voltage V1 may be applied to the core electrode line 10 through the pair of first pads PAD1. According to some embodiments, the first voltage V1 may be applied to the core electrode line 10 through one of the pair of first pads PAD1, and the other one of the pair of first pads PAD1 may be an electrically floated dummy pad.

The conductive layer 50 may be electrically connected to a second pad PAD2 of the pads PAD1 and PAD2. The conductive layer 50 may contact the second pad PAD2. The conductive layer 50 may function as an outer electrode of the wire capacitor WCAP, and a second voltage V2 may be applied to the conductive layer 50 through the second pad PAD2.

The first voltage V1 and the second voltage V2 may be different from each other. For example, one of the first voltage V1 and the second voltage V2 may be a power voltage, the other one of the first voltage V1 and the second voltage V2 may be a ground voltage. Therefore, the second pad PAD2 may be connected to a circuit that operates by receiving a second voltage V2 and the first pads PAD1 may be connected to a circuit that operates by receiving a first voltage V1. As different voltages are applied to the core electrode line 10 and the conductive layer 50, charges may accumulate in the dielectric line 20. Accordingly, the wire capacitor WCAP that has the wire shape and functions as a capacitor may be implemented.

Hereinafter, a manufacturing method of the wire capacitor WCAP is described.

Referring to FIGS. 4 to 6, the wire structure WS may be provided on a substrate including the pads PAD1 and PAD2. One end of the core electrode line 10 may be connected to one of the pair of first pads PAD1 using a wire bonding manner, at the first end E1 of the wire structure WS. The other end of the core electrode line 10 may be connected to the other one of the pair of first pads PAD1 using a wire bonding manner, at the second end E2 of the wire structure WS.

A portion of the wire structure WS may be disposed on the second pad PAD2. The conductive layer 50 may be formed to cover the portion of the wire structure WS and the second pad PAD2. The conductive layer 50 may be directly attached to the outer surface 20S of the dielectric line 20 and the second pad PAD2. Forming the conductive layer 50 may include attaching a conductive paste to the portion of the wire structure WS and the second pad PAD2. While forming the conductive layer 50, the length 50L of the conductive layer 50 may be adjusted. Accordingly, the capacitance of the wire capacitor WCAP may be adjusted. In one embodiment, the conductive layer 50 may be applied after the first end E1 and second end E2 of the wire structure WS have been connected to (e.g., bonded to) the pair of first pads PAD1. However, the embodiments are not limited thereto and the order of application of the conductive layer 50 and bonding of the wire structure WS to pads may vary.

According to embodiments of the inventive concept, the wire structure WS of the wire capacitor WCAP may be connected to the pads PAD1 and PAD2 by a wire bonding manner. As the wire structure WS has a wire shape, the wire capacitor WCAP may be easily miniaturized. In addition, as the wire structure WS is connected to the pads PAD1 and PAD2 by the wire bonding manner, the wire capacitor WCAP may be easily mounted on the substrate. In addition, during forming the conductive layer 50 of the wire capacitor WCAP, the length 50L of the conductive layer 50 may be adjusted. Accordingly, the capacitance of the wire capacitor WCAP may be adjusted. Therefore, a wire capacitor that is easy to be miniaturized, is easily mounted on a substrate, and has adjustable capacitance may be provided.

Figure 7:
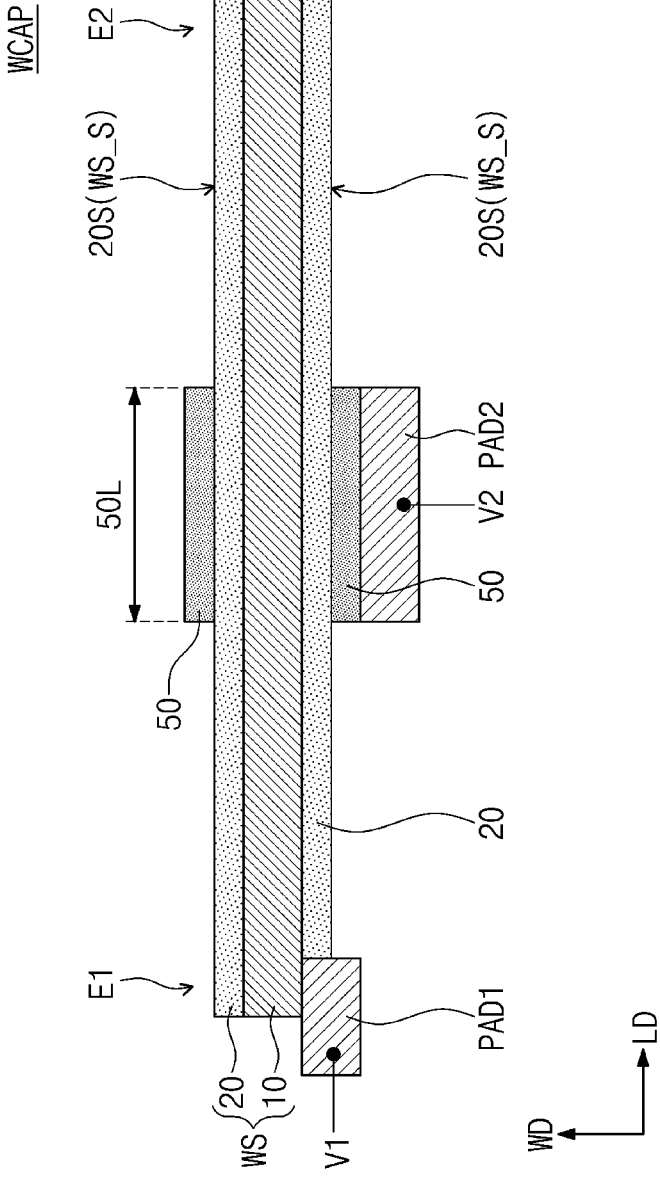
FIG. 7 is a diagram illustrating a wire capacitor according to some embodiments of the inventive concept and is a cross-sectional view taken along the line A-A' of FIG. 4.

FIG. 7 is a diagram illustrating a wire capacitor according to some embodiments of the inventive concept and is a cross-sectional view taken along the line A-A' of FIG. 4. For the simplification of the description, differences from the wire capacitor described with reference to FIGS. 4 to 6 are mainly described.

Referring to FIG. 7, according to some embodiments, one end of the core electrode line may be connected to the first pad PAD1 of the pads PAD1 and PAD2, by a wire bonding manner (e.g., a ball bonding manner or a wedge bonding manner), at the first end E1 of the wire structure WS. The second end E2 of the wire structure WS may not be connected to the pads PAD1 and PAD2. The first voltage V1 may be applied to the core electrode line 10 through the first pad PAD.

The conductive layer 50 may be electrically connected to the second pad PAD2 of the pads PAD1 and PAD2. The conductive layer 50 may contact the second pad PAD2. The conductive layer 50 may function as an outer electrode of the wire capacitor WCAP, and the second voltage V2 may be applied to the conductive layer 50 through the second pad PAD2. According to the embodiments of FIGS. 4-7, as well as other embodiments, a wire capacitor may have an outer electrode in only a middle portion of a wire, such that opposite ends of a wire structure are not covered by the outer electrode. The outer electrode at the a middle portion of the wire capacitor may connect to a bonding pad, in addition to one or both opposite ends of the wire capacitor being connected to respective bonding pad(s).

Figure 8:
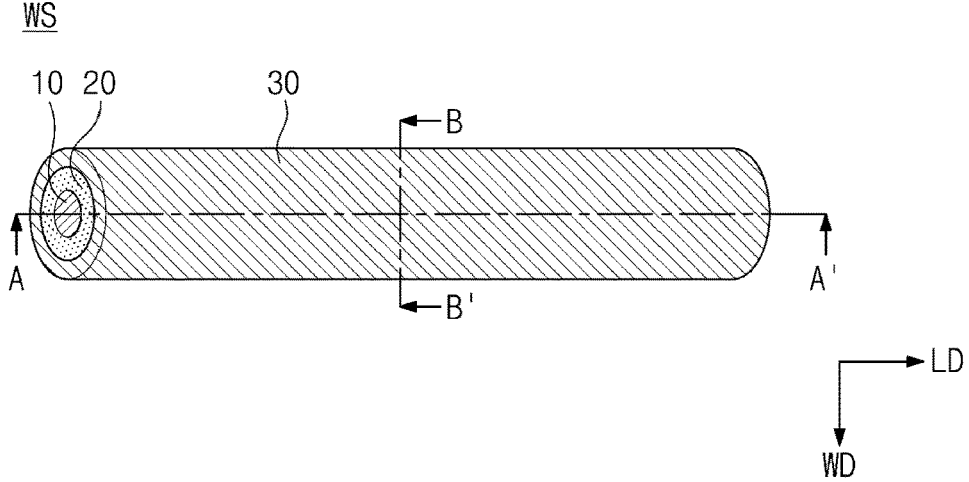
FIG. 8 is a schematic perspective view of a wire structure according to some embodiments of the inventive concept.
Figure 9:
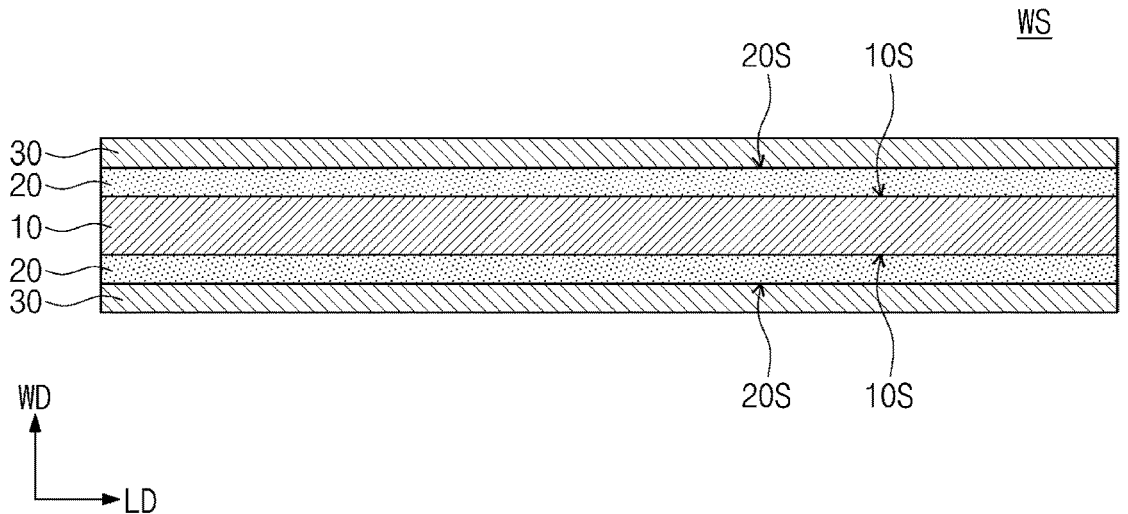
FIG. 9 is a cross-sectional view taken along the line A-A' of FIG. 8.
Figure 10:
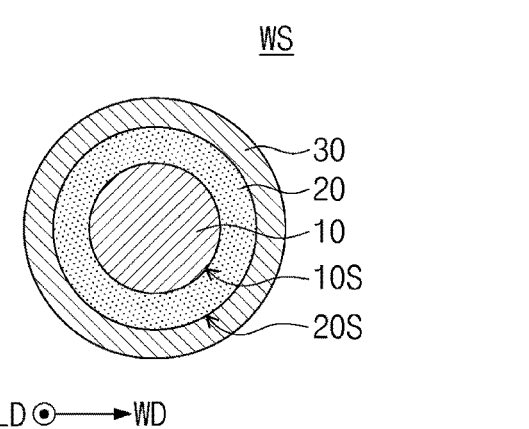
FIG. 10 is a cross-sectional view taken along the line B-B' of FIG. 8.

FIG. 8 is a schematic perspective view of a wire structure according to some embodiments of the inventive concept. FIG. 9 is a cross-sectional view taken along the line A-A' of FIG. 8, FIG. 10 is a cross-sectional view taken along the line B-B' of FIG. 8. For the simplification of the description, differences from the wire structure described with reference to FIGS. 1, 2, 3A and 3B are mainly described.

Referring to FIGS. 8 to 10, a wire structure WS may include a core electrode line 10, a dielectric line 20 surrounding an outer surface 10S of the core electrode line 10, and an outer electrode line 30 surrounding an outer surface 20S of the dielectric line 20. The core electrode line 10 and the dielectric line 20 are substantially the same as the core electrode line 10 and the dielectric line 20 described with reference to FIGS. 1, 2, 3A and 3B.

The outer electrode line 30 may surround the outer surface 20S of the dielectric line 20 and may extend along the outer surface 20S of the dielectric line 20 in the longitudinal direction LD. The outer electrode line 30 may be electrically separated (or insulated) from the core electrode line 10 by the dielectric line 20. The outer electrode line 30 may contact the outer surface 20S of the dielectric line 20.

The outer electrode line 30 may include or be formed of a material having a lower melting point than that of the core electrode line 10 (e.g., a metal alloy with a lower melting point than that of the core electrode line 10). In addition, the outer electrode line 30 may include or be formed of a material having a lower mechanical strength than that of the core electrode line 10 (e.g., a metal alloy having a lower mechanical strength than that of the core electrode line 10). For example, the outer electrode line 30 may include or be formed of a second metal different from the first metal, and may include or be an alloy of the second metal. The outer electrode line 30 may include or be at least one of, for example, arsenic-copper alloy, aluminum-cerium alloy, aluminum-smaydium alloy, silver-germanium alloy, silver-palladium alloy, aluminum-indium alloy, field's metal, arsenic-antimony alloy, aluminum-magnesium alloy, magnesium-praseodymium alloy, arsenic-tin alloy, aluminum-silicon alloy, gold-magnesium alloy, aluminum-gold alloy, silver-aluminum alloy, gold-lanthanum alloy, aluminum-copper alloy, silver-calcium alloy, aluminum-calcium alloy, silver-arsenic alloy, silver-cerium alloy, gold-cerium alloy, silver-lanthanum alloy, magnesium-nickel alloy, gold-cadmium alloy, silver-antimony alloy, silver-magnesium alloy, silver-strontium alloy, babbitt metal, aluminum-germanium alloy, magnesium-strontium alloy, gold-tellurium alloy, aluminum-zinc alloy, gold-silicon alloy, gold-antimony alloy, gold-germanium alloy, silver-tellurium alloy, magnesium-zinc alloy, and silver-lead alloy.

The wire structure WS may be manufactured in substantially the same manner as the wire structure WS described with reference to FIGS. 1, 2, 3A, and 3B. According to the present embodiments, forming the wire structure WS may further include depositing the outer electrode line 30 on the outer surface 20S of the dielectric line 20. Depositing the outer electrode line 30 may be performed by, for example, a physical vapor deposition method, a chemical vapor deposition method, or an atomic layer deposition method.

Figure 11:
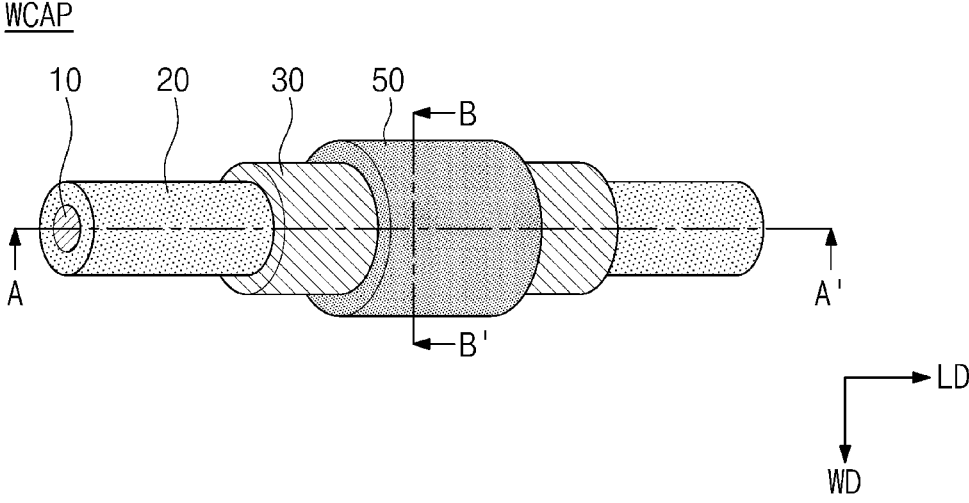
FIG. 11 is a schematic perspective view of a wire capacitor according to some embodiments of the inventive concept.
Figure 12:
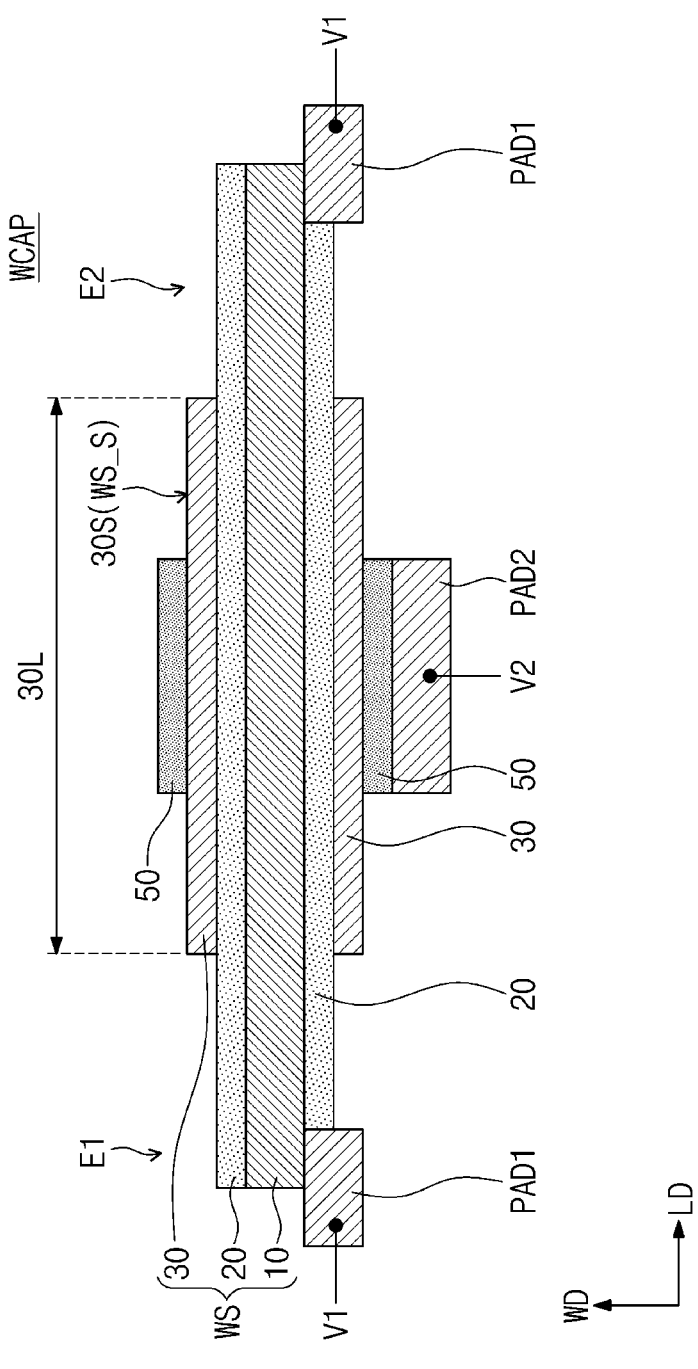
FIG. 12 is a cross-sectional view taken along the line A-A' of FIG. 11.
Figure 13:
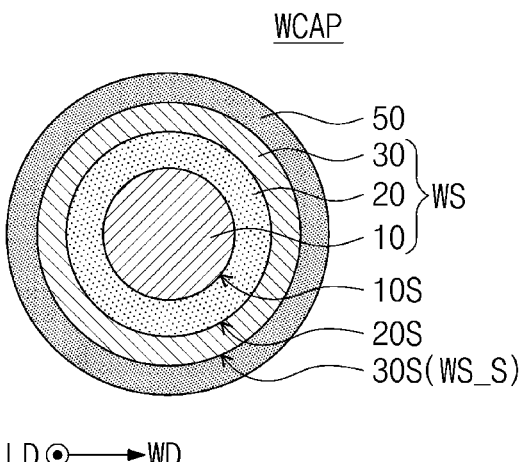
FIG. 13 is a cross-sectional view taken along the line B-B' of FIG. 11.

FIG. 11 is a schematic perspective view of a wire capacitor according to some embodiments of the inventive concept. FIG. 12 is a cross-sectional view taken along the line A-A' of FIG. 11, and FIG. 13 is a cross-sectional view taken along the line B-B' of FIG. 11. For the simplification of the description, differences from the wire capacitor described with reference to FIGS. 4 to 6 are mainly described.

Referring to FIGS. 11 to 13, a wire capacitor WCAP may include a wire structure WS, and a conductive layer 50 covering an outer surface WS_S of the wire structure WS. According to some embodiments, the wire structure WS may be the wire structure WS described with reference to FIGS. 8 to 10. The wire structure WS may have a wire shape extending in the longitudinal direction LD, and may have a first end E1 and a second end E2 which are opposite to each other in the longitudinal direction LD. The outer surface WS_S of the wire structure WS may correspond to an outer surface 30S of an outer electrode line 30.

The outer electrode line 30 may expose the dielectric line 20 at the first end E1 and the second end E2 of the wire structure WS. As a length 30L (e.g., a length in the longitudinal direction LD) of the outer electrode line 30 is adjusted, capacitance of the wire capacitor WCAP may be adjusted.

The conductive layer 50 may cover the outer surface 30S of the outer electrode line 30, and may contact the outer electrode line 30. The conductive layer 50 may include or be formed of a conductive paste (e.g., Ag paste or solder paste).

The wire capacitor WCAP may be connected to the pads PAD1 and PAD2. According to some embodiments, ends of the core electrode line 10 may be electrically connected to the pair of first pads PAD1, respectively using a wire bonding manner, at the first end E1 and the second end E2 of the wire structure WS. For example, one end of the core electrode line 10 may be connected to one of the pair of first pads PAD1 by a ball bonding manner or a wedge bonding manner, at the first end E1 of the wire structure WS. The other end of the core electrode line 10 may be connected to the other one of the pair of first pads PAD1 by a ball bonding manner or a wedge bonding manner, at the second end E2 of the wire structure WS. During the wire bonding, portions of the dielectric line 20 between the ends of the core electrode line 10 and the pair of first pads PAD1 may be removed.

The conductive layer 50 may be connected to the second pad PAD2. The conductive layer 50 may contact the second pad PAD2. The outer electrode line 30 may be electrically connected to the second pad PAD2 through the conductive layer 50.

The first voltage V1 may be applied to the core electrode line 10 through the pair of first pads PAD1, and the second voltage V2 may be applied to the outer electrode line 30 through the second pad PAD2 and the conductive layer 50. As different voltages are applied to the core electrode line 10 and the outer electrode line 30, charges may accumulate in the dielectric line 20. Accordingly, the wire capacitor WCAP having a wire shape and functioning as a capacitor may be implemented.

Hereinafter, a manufacturing method of the wire capacitor WCAP is described.

Referring to FIGS. 11 to 13, portions of the outer electrode line 30 may be removed to expose the dielectric line 20 at the first end E1 and the second end E2 of the wire structure WS. The portions of the outer electrode line 30 may be removed using, for example, a laser. While removing the portions of the outer electrode line 30, a length 30L of the outer electrode line 30 may be adjusted. Accordingly, capacitance of the wire capacitor WCAP may be adjusted.

Thereafter, the wire structure WS may be provided on a substrate including the pads PAD1 and PAD2. One end of the core electrode line 10 may be connected to one of the pair of first pads PAD1 using a wire bonding manner, at the first end E1 of the wire structure WS. The other end of the core electrode line 10 may be connected to the other one of the pair of first pads PAD1 using a wire bonding manner, at the second end E2 of the wire structure WS. During the wire bonding, portions of the dielectric line 20 between the ends of the core electrode line 10 and the pair of first pads PAD1 may be removed.

A portion of the wire structure WS may be disposed on the second pad PAD2. The conductive layer 50 may be formed to cover the portion of the wire structure WS and the second pad PAD2. The conductive layer 50 may be directly attached to the outer surface 30S of the outer electrode line 30 and the second pad PAD2.

Except for the difference described above, the wire capacitor WCAP may be prepared in substantially the same method as the wire capacitor WCAP described with reference to FIGS. 4 to 6.

According to the embodiments of the inventive concept, the wire structure WS of the wire capacitor WCAP may be connected to the pads PAD1 and PAD2 by a wire boding manner. As the wire structure WS has a wire shape, the wire capacitor WCAP may be easily miniaturized. In addition, as the wire structure WS is connected to the pads PAD1 and PAD2 by a wire bonding manner, the wire capacitor WCAP may be easily mounted on the substrate. Furthermore, the portions of the outer electrode line 30 may be removed at the first end E1 and the second end E2 of the wire structure WS so that the dielectric line 20 is exposed. While removing the portions of the outer electrode line 30, the length 30L of the outer electrode line 30 may be adjusted. Accordingly, the capacitance capacity of the wire capacitor WCAP may be adjusted. Therefore, the wire capacitor that is easily miniaturized, is easily mounted on the substrate, and is capable of adjusting capacitance may be provided.

Figure 14:
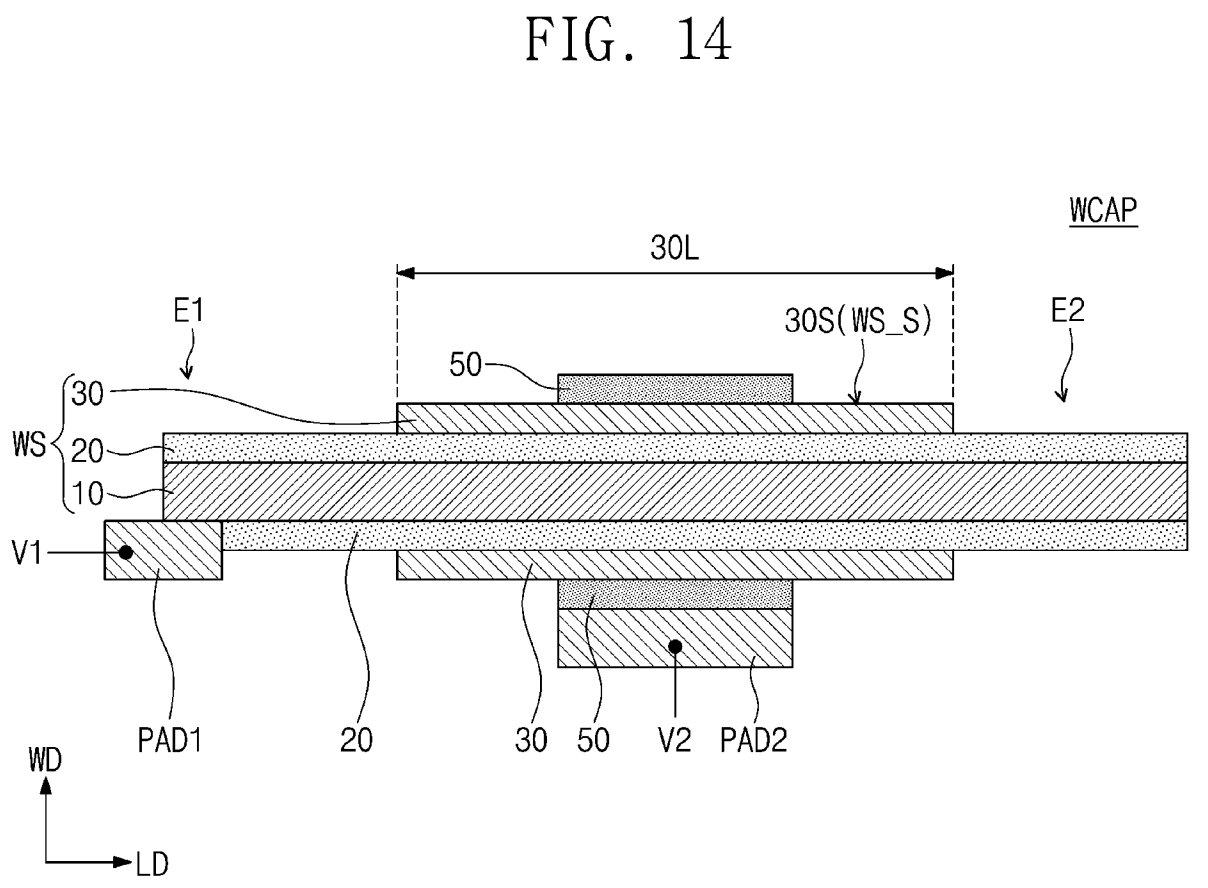

FIG. 14 is a diagram showing a wire capacitor according to some embodiments of the inventive concept and is a cross-sectional view taken along the line A-A' of FIG. 11. For the simplification of the description, differences from the wire capacitor described with reference to FIGS. 11 to 13 are mainly described.

Referring to FIG. 14, according to some embodiments, one end of the core electrode line may be connected to the first pad PAD1 of the pads PAD1 and PAD2 by a wire bonding manner (e.g., by a ball bonding manner or a wedge bonding manner), at the first end E1 of the wire structure WS. The second end E2 of the wire structure WS may not be connected to the pads PAD1 and PAD2. The first voltage V1 may be applied to the core electrode line 10 through the first pad PAD1.

The conductive layer 50 may be connected to the second pad PAD2 of the pads PAD1 and PAD2. The conductive layer 50 may contact the second pad PAD2. The outer electrode line may be electrically connected to the second pad PAD2 through the conductive layer 50, and the second voltage V2 may be applied to the outer electrode line 30 through the second pad PAD2 and the conductive layer 50.

Figure 15:
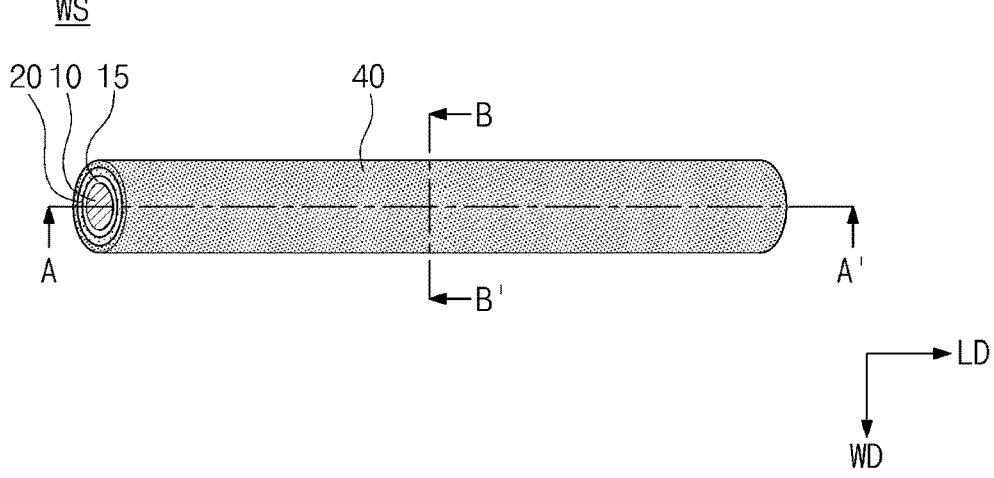
FIG. 15 is a schematic perspective of a wire structure according to some embodiments of the inventive concept.
Figure 16:
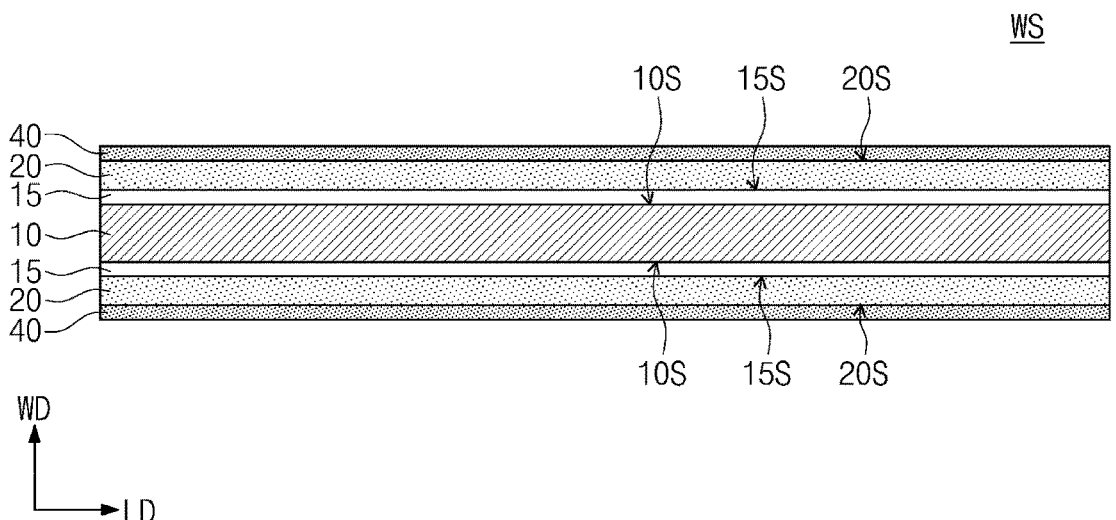
FIG. 16 is a cross-sectional view taken along the line A-A' of FIG. 15.
Figure 17:
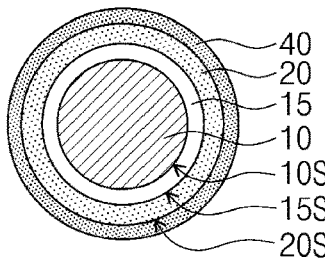
FIG. 17 is a cross-sectional view taken along the line B-B' of FIG. 15.

FIG. 15 is a schematic perspective of a wire structure according to some embodiments of the inventive concept. FIG. 16 is a cross-sectional view taken along the line A-A' of FIG. 15, FIG. 17 is a cross-sectional view taken along the line B-B' of FIG. 15. For the simplification of the description, differences from the wire structure described with reference to FIGS. 1, 2, 3A and 3B are mainly described.

Referring to FIGS. 15 to 17, a wire structure WS may include a core electrode line 10, a dielectric line 20 surrounding an outer surface 10S of the core electrode line 10, an adhesive layer between the core electrode line 10 and the dielectric line 20, and a passivation line 40 surrounding an outer surface 20S of the dielectric line 20.

The core electrode line 10 is substantially the same as the core electrode line 10 described with reference to FIGS. 1, 2, 3A and 3B.

The adhesive layer 15 may surround the outer surface 10S of the core electrode line 10, and may extend in the longitudinal direction LD along the outer surface 10S of the core electrode line 10. The adhesive layer 15 may contact the outer surface 10S of the core electrode line 10. The adhesive layer 15 may increase adhesion between the core electrode line 10 and the dielectric line 20 or may be used to prevent diffusion of elements between the core electrode line 10 and the dielectric line 20. For example, the adhesive layer 15 may include or be at least one of TiN, TaN, WN, NiSi, WSi, Ag, Ni, steel, Al$_2$O$_3$, TiO$_2$, and BaO.

The dielectric line 20 may surround an outer surface 15S of the adhesive layer 15, and may be extended along the outer surface 15S of the adhesive layer 15 in the longitudinal direction LD. The dielectric line 20 may contact the outer surface 15S of the adhesive layer 15. The dielectric line 20 is substantially the same as the dielectric line 20 described with reference to FIGS. 1, 2, 3A and 3B, except for the above-mentioned difference.

The passivation line 40 may surround the outer surface 20S of the dielectric line 20, and may extend along the outer surface 20S of the dielectric line 20 in the longitudinal direction LD. The passivation line 40 may contact the outer surface 20S of the dielectric line 20. The passivation line 40 may be used to protect the dielectric line 20. The passivation line 40 may include or be an insulating material (e.g., Al$_2$O$_3$) or a metal (e.g., Au, Ni, or Pd) which has a lower permittivity than that of the dielectric line 20.

Hereinafter, a manufacturing method of the wire structure WS according to the present embodiment is described.

Referring to FIGS. 15 to 17, forming the wire structure WS may include, for example, providing the core electrode line 10 having a wire shape, depositing the adhesive layer 15 on the outer surface 10S of the core electrode line 10, depositing the dielectric line 20 on the outer surface 15S of the adhesive layer 15, and depositing the passivation line 40 on the outer surface 20S of the dielectric line 20. Depositing each of the adhesive layer 15, the dielectric line 20, and the passivation line 40 may be performed by, for example, a physical vapor deposition method, a chemical vapor deposition method, or an atomic layer deposition method. The wire structure WS according to the present embodiments may be manufactured in substantially the same manner as the wire structure WS described with reference to FIGS. 1, 2, 3A, and 3B, except for the above-described difference.

Figure 18:
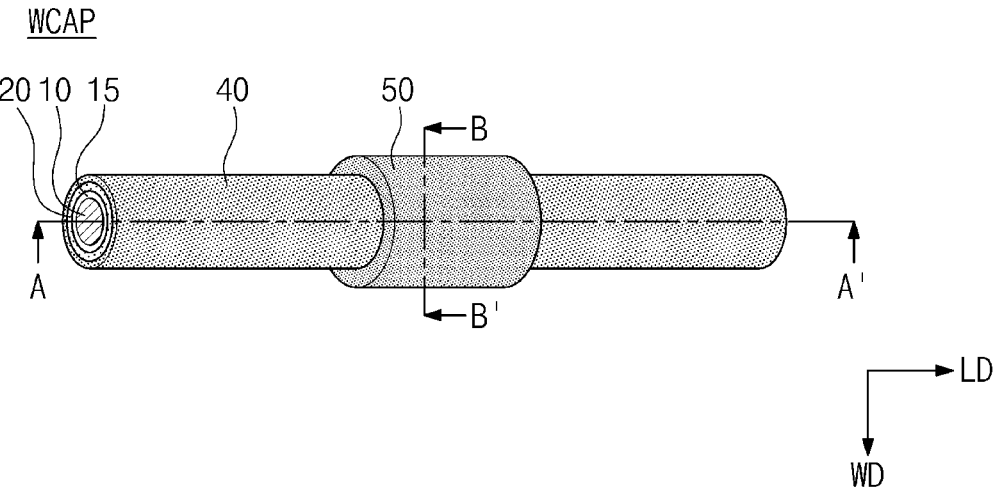
FIG. 18 is a schematic perspective view of a wire capacitor according to some embodiments of the inventive concept.
Figure 19:
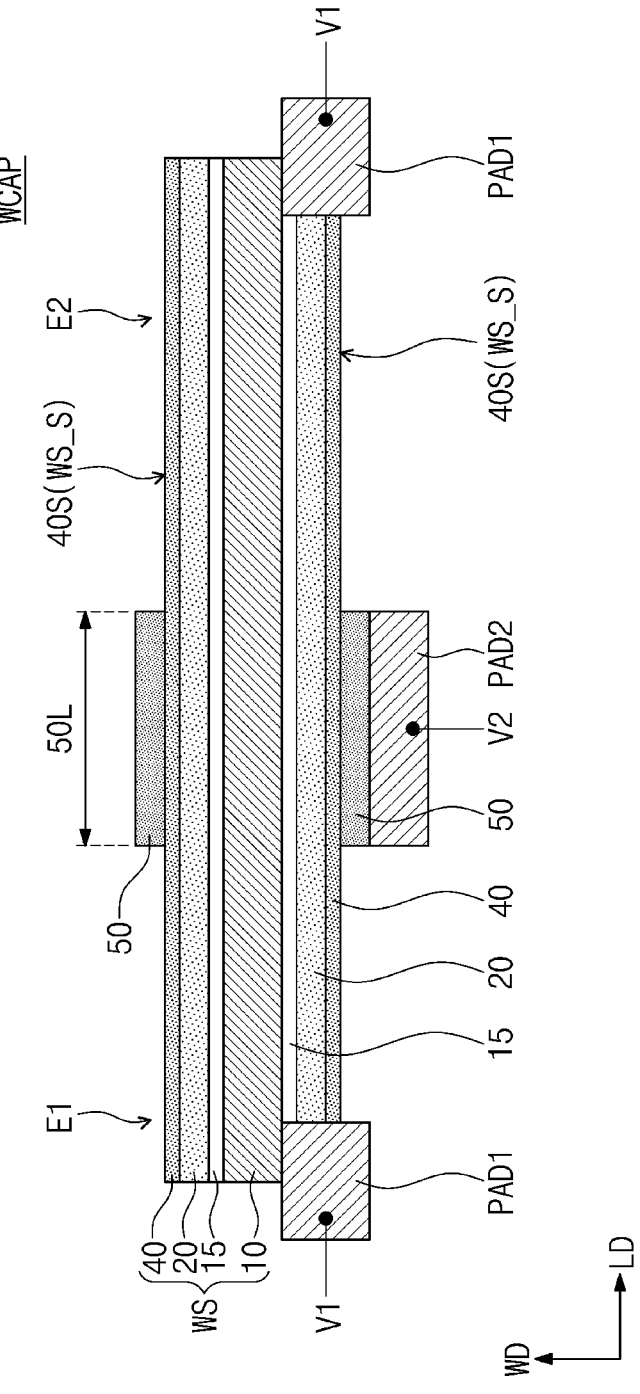
FIG. 19 is a cross-sectional view taken along the line A-A' of FIG. 18.
Figure 20:
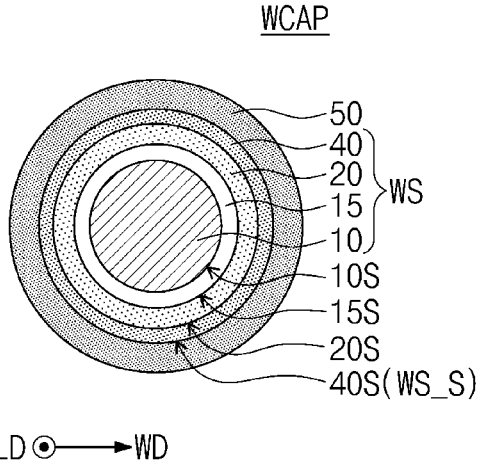
FIG. 20 is a cross-sectional view taken along the line B-B' of FIG. 18.

FIG. 18 is a schematic perspective view of a wire capacitor according to some embodiments of the inventive concept. FIG. 19 is a cross-sectional view taken along the line A-A' of FIG. 18, and FIG. 20 is a cross-sectional view taken along the line B-B' of FIG. 18. For the simplification of the description, differences from the wire capacitor described with reference to FIGS. 4 to 6 are mainly described.

Referring to FIGS. 18 to 20, a wire capacitor WCAP may include a wire structure WS, and a conductive layer 50 covering an outer surface WS_S of the wire structure WS. According to some embodiments, the wire structure WS may be the wire structure WS described with reference to FIGS. 15 to 17. The wire structure WS may have a wire shape extending in the longitudinal direction LD, and may have a first end E1 and a second end E2 which are opposite to each other in the longitudinal direction LD. The outer surface WS_S of the wire structure WS may correspond to an outer surface 40S of the passivation line 40.

The conductive layer 50 may expose the first end E1 and the second end E2 of the wire structure WS. The conductive layer 50 may cover the outer surface 40S of the passivation line and may contact the passivation line 40. According to some embodiments, the conductive layer 50 may function as an outer electrode of the wire capacitor WCAP. As a length 50L (e.g., a length in the longitudinal direction LD) of the conductive layer 50 is adjusted, capacitance of the wire capacitor WCAP may be adjusted.

According to some embodiments, ends of the core electrode line 10 may be electrically connected to the first pads PAD1, respectively using a wire bonding manner, at the first end E1 and the second end E2 of the wire structure WS. For example, one end of the core electrode line 10 may be connected to one of the first pads PAD1 by a ball bonding manner or a wedge bonding manner, at the first end E1 of the wire structure WS. The other end of the core electrode line 10 may be connected to the other one of the first pads PAD1 by a ball bonding manner or a wedge bonding manner, at the second end E2 of the wire structure WS. According to other embodiments, as described with reference to FIG. 7, the second end E2 of the wire structure WS may not be connected to the pads PAD1 and PAD2. The first voltage V1 may be applied to the core electrode line 10 through at least one of the pair of first pads PAD1.

The conductive layer 50 may be electrically connected to the second pad PAD2. The conductive layer 50 may contact the second pad PAD2. The conductive layer 50 may function as an outer electrode of the wire capacitor WCAP, and a second voltage V2 may be applied to the conductive layer 50 through the second pad PAD2.

As different voltages are applied to the core electrode line 10 and the conductive layer 50, charges may accumulate in the dielectric line 20. Accordingly, the wire capacitor WCAP having a wire shape and functioning as a capacitor may be implemented. The wire capacitor WCAP according to the present embodiments may be manufactured in substantially the same way as the wire capacitor WCAP described with reference to FIGS. 4 to 6.

Figure 21:
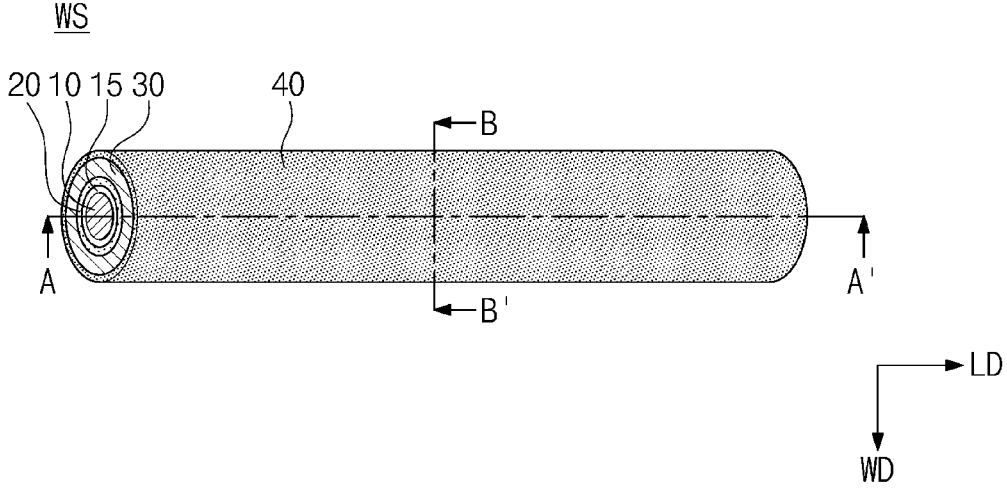
FIG. 21 is a schematic perspective view of a wire structure according to some embodiments of the inventive concept.
Figure 22:
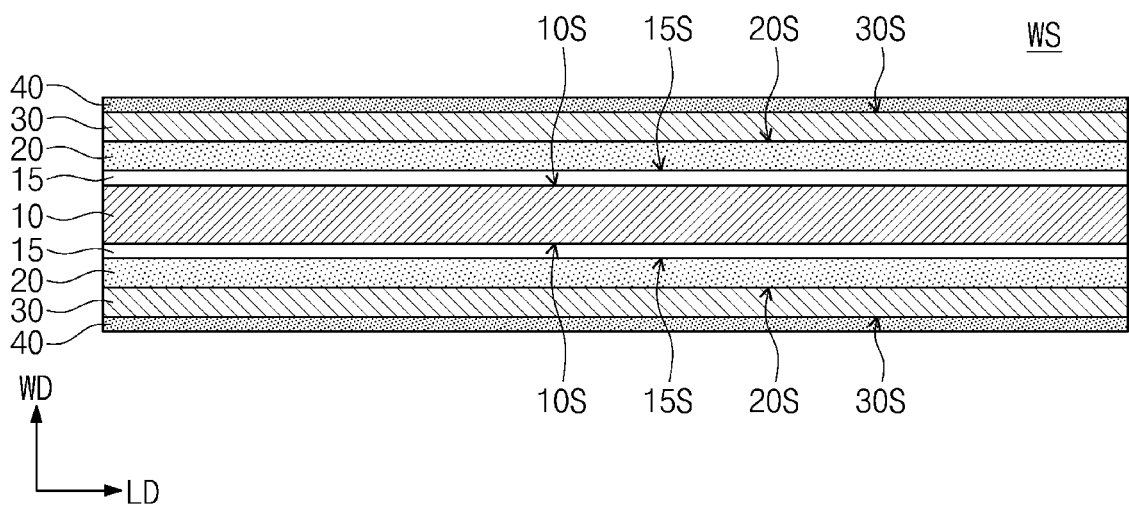
FIG. 22 is a cross-sectional view taken along the line A-A' of FIG. 21.
Figures 23, 24:
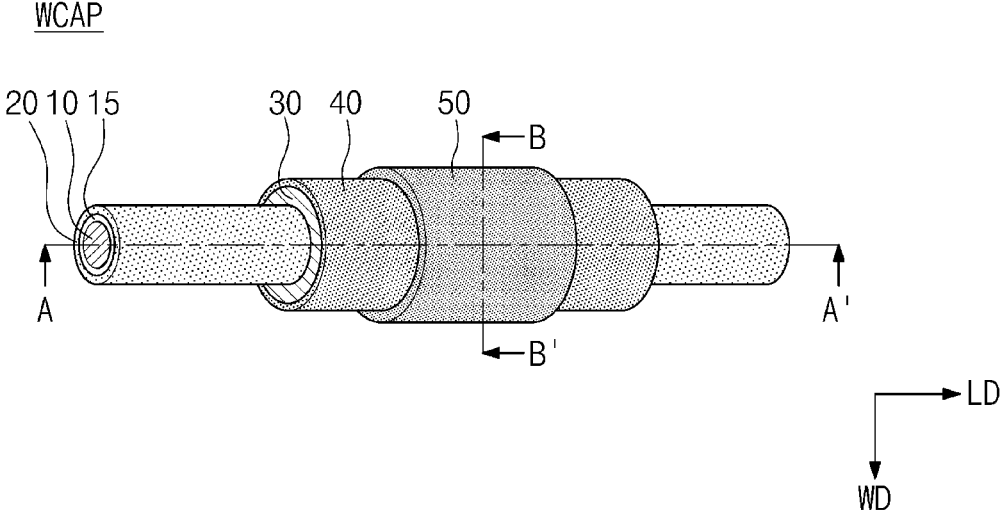
FIG. 23 is a cross-sectional view taken along the line B-B' of FIG. 21.
FIG. 24 is a schematic perspective view of a wire capacitor according to some embodiments of the inventive concept.

FIG. 21 is a schematic perspective view of a wire structure according to some embodiments of the inventive concept. FIG. 22 is a cross-sectional view taken along the line A-A' of FIG. 21, and FIG. 23 is a cross-sectional view taken along the line B-B' of FIG. 21. For the simplification of the description, differences from the wire capacitor described with reference FIGS. 8 to 10 are mainly described.

Referring to FIGS. 21 to 23, a wire structure WS may include a core electrode line 10, a dielectric line 20 surrounding an outer surface 10S of the core electrode line 10, an adhesive layer 15 between the core electrode line 10 and the dielectric line 20, an outer electrode line 30 surrounding an outer surface 20S of the dielectric line 20, and a passivation line 40 surrounding an outer surface 30S of the outer electrode line 30.

The core electrode line 10 is substantially the same as the core electrode line 10 described with reference to FIGS. 1, 2, 3A and 3B.

The adhesive layer 15 may surround the outer surface 10S of the core electrode line 10, and may extend in the longitudinal direction LD along the outer surface 10S of the core electrode line 10. The adhesive layer 15 may be in direct contact with the outer surface 10S of the core electrode line 10. The adhesive layer 15 is substantially the same as the adhesive layer 15 described with reference to FIGS. 15 to 17.

The dielectric line 20 may surround an outer surface 15S of the adhesive layer 15, and may be extended along the outer surface 15S of the adhesive layer 15 in the longitudinal direction LD. The dielectric line 20 may contact the outer surface 15S of the adhesive layer 15. The dielectric line 20 is substantially the same as the dielectric line 20 described with reference to FIGS. 1, 2, 3A and 3B, except for the above-mentioned difference.

The outer electrode line 30 may surround the outer surface 20S of the dielectric line 20, and may extend along the outer surface 20S of the dielectric line 20 in the longitudinal direction LD. The outer electrode line 30 may be electrically separated (or insulated) from the core electrode line 10 by the dielectric line 20. The outer electrode line 30 may contact the outer surface 20S of the dielectric line 20. The outer electrode line 30 is substantially the same as the outer electrode line 30 described with reference to FIGS. 8 to 10.

The passivation line 40 may surround the outer surface 30S of the outer electrode line 30, and may be extended along the outer surface 30S of the outer electrode line 30 in the longitudinal direction LD. The passivation line 40 may contact the outer surface 30S of the outer electrode line 30. The passivation line 40 is substantially the same as the passivation line 40 described with reference to FIGS. 15 to 17, except for the above-mentioned differences.

Hereinafter, a manufacturing method of the wire structure WS according to the present embodiment is described.

Referring to FIGS. 21 to 23, forming the wire structure WS may include, for example, providing the core electrode line 10 having a wire shape, depositing the adhesive layer 15 on the outer surface 10S of the core electrode line 10, depositing the dielectric line 20 on the outer surface of the adhesive layer 15, depositing the outer electrode line 30 on the outer surface 20S of the dielectric line 20, and depositing the passivation line 40 on the outer surface 30S of the outer electrode line 30. Depositing each of the adhesive layer 15, the dielectric line 20, the outer electrode line 30, and the passivation line 40 may be performed by, for example, a physical vapor deposition method, a chemical vapor deposition method, or an atomic layer deposition method. The wire structure WS according to the present embodiments may be manufactured in substantially the same manner as the wire structure WS described with reference to FIGS. 1, 2, 3A, and 3B, except for the above-described difference.

Figure 25:
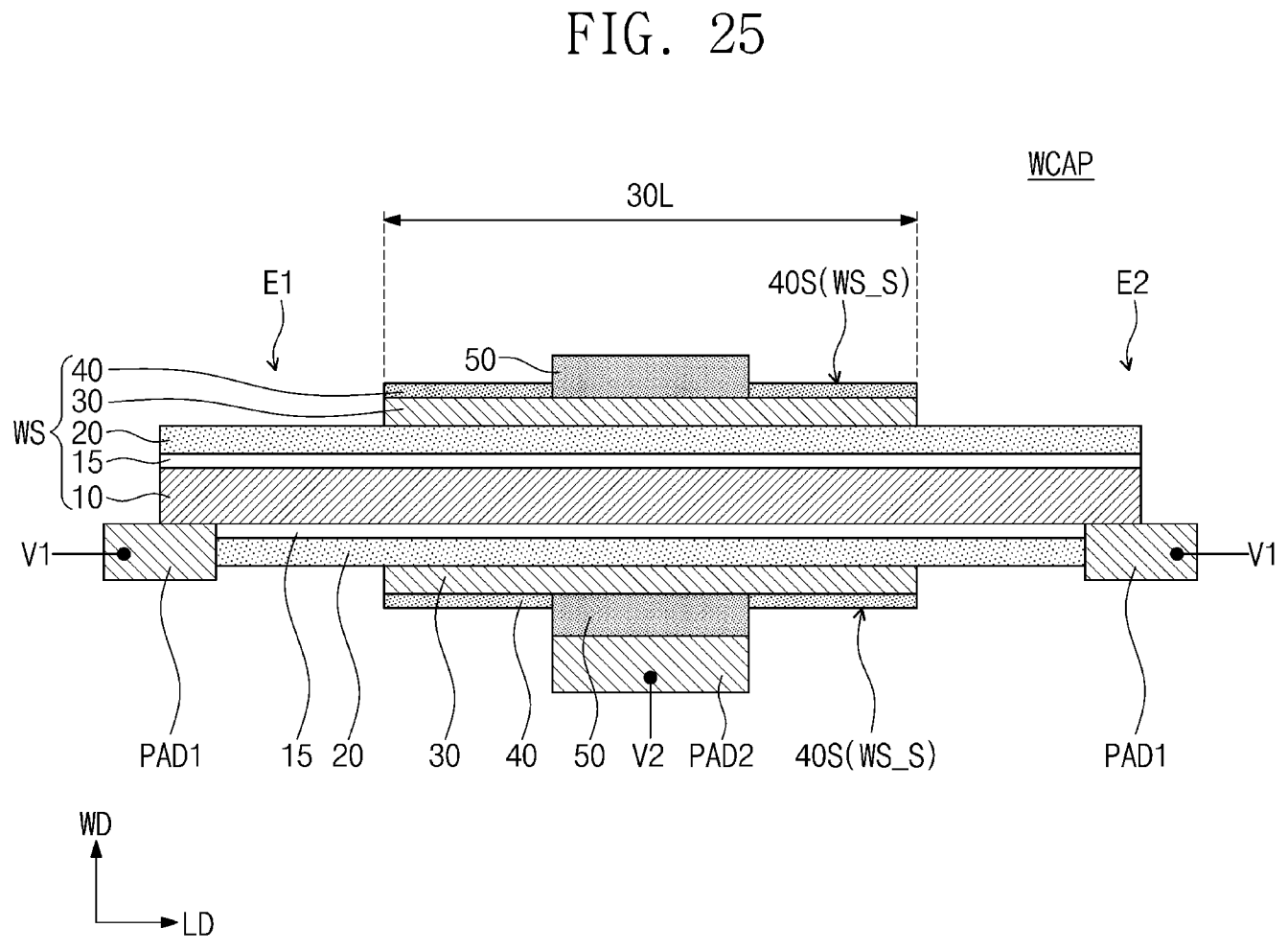
Figure 26:
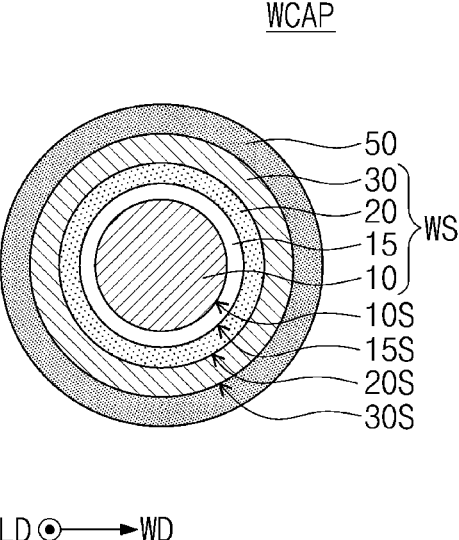
FIG. 26 is a cross-sectional view taken along the line B-B' of FIG. 24.

FIG. 24 is a schematic perspective view of a wire capacitor according to some embodiments of the inventive concept. FIG. 25 is a cross-sectional view taken along the line A-A' of FIG. 24, and FIG. 26 is a cross-sectional view taken along the line B-B' of FIG. 24. For the simplification of the description, differences from the wire capacitor described with reference to FIGS. 11 to 13 are mainly described.

Referring to FIGS. 24 to 26, a wire capacitor WCAP may include a wire structure WS and a conductive layer 50 covering an outer surface WS_S of the wire structure WS. According to some embodiments, the wire structure WS may be the wire structure WS described with reference to FIGS. 21 to 23. The wire structure WS may have a wire shape extending in the longitudinal direction LD, and may have a first end E1 and a second end E2 which are opposite to each other in the longitudinal direction LD. The outer surface WS_S of the wire structure WS may correspond to the outer surface 40S of the passivation line 40S.

The outer electrode line 30 and the passivation line 40 may expose the dielectric line 20 at the first end E1 and the second end E2 of the wire structure WS. As a length 30L (e.g., a length in the longitudinal direction LD) of the outer electrode line 30 is adjusted, capacitance of the wire capacitor WCAP may be adjusted. The conductive layer 50 may be electrically connected to the outer electrode line 30 penetrating through the passivation line 40 and, for example, may] contact the outer electrode line 30.

The wire capacitor WCAP may be connected to the pads PAD1 and PAD2. For example, one end of the core electrode line 10 may be connected to one of the pair of first pads PAD1 by a ball bonding manner or wedge bonding manner, at the first end E1 of the wire structure WS. The other end of the core electrode line 10 may be connected to the other one of the pair of first pads PAD1 by a ball bonding manner or a wedge bonding manner, at the second end E2 of the wire structure WS. During the wire bonding (i.e. the ball bonding or the wedge bonding), portions of the dielectric line 20 and portion of the adhesive layer 15, between the ends of the core electrode line 10 and the pair of first pads PAD1, may be removed. According to some embodiments, as described with reference to FIG. 14, the second end E2 of the wire structure WS may not be connected to the pads PAD1 and PAD2.

The conductive layer 50 may be connected to the second pad PAD2. The conductive layer 50 may contact the second pad PAD2. The outer electrode line 30 may be electrically connected to the second pad PAD2 through the conductive layer 50.

The first voltage V1 may be applied to the core electrode line 10 through the pair of first pads PAD1, and the second voltage V2 may be applied to the outer electrode line 30 through the second pad PAD2 and the conductive layer 50. As different voltages are applied to the core electrode line 10 and the outer electrode line 30, charges may accumulate in the dielectric line 20. Accordingly, the wire capacitor WCAP having a wire shape and functioning as a capacitor may be implemented.

Hereinafter, the manufacturing method of the wire capacitor WCAP according to the present embodiments is described.

Referring to FIGS. 24 to 26, portions of the outer electrode line 30 and portions of the passivation line 40 may be removed to expose the dielectric line 20 at the first end E1 and the second end E2 of the wire structure WS. The portions of the outer electrode line 30 and the portions of the passivation line 40 may be removed using, for example, a laser. While removing the portions of the outer electrode line 30, the length 30L of the outer electrode line 30 may be adjusted. Accordingly, the capacitance of the wire capacitor WCAP may be adjusted. The wire capacitor WCAP may be manufactured in substantially the same manner as the wire capacitor WCAP described with reference to FIGS. 11 to 13, except for the above difference.

Figure 27:
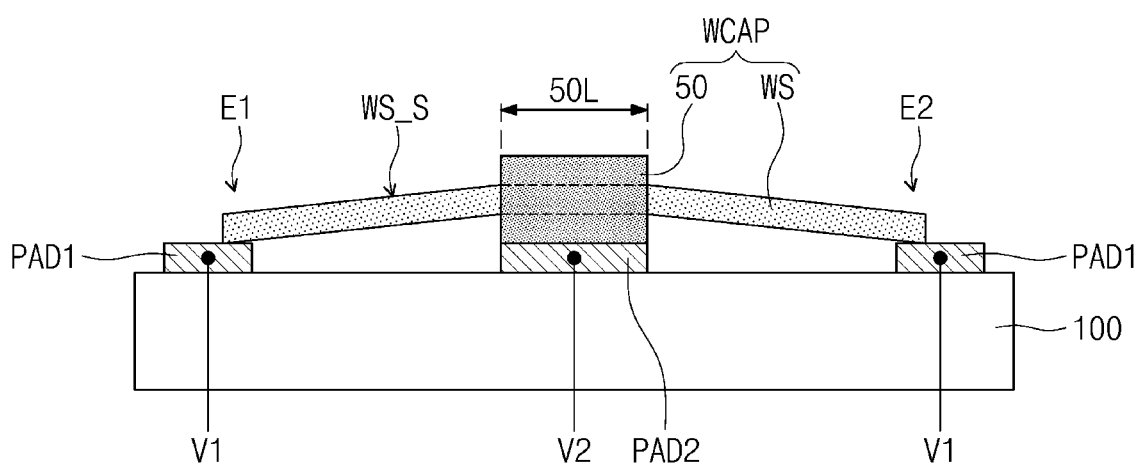
FIGS. 27 and 28 are conceptual diagrams of electronic devices including a wire capacitor according to embodiments of the inventive concept.
Figure 28:
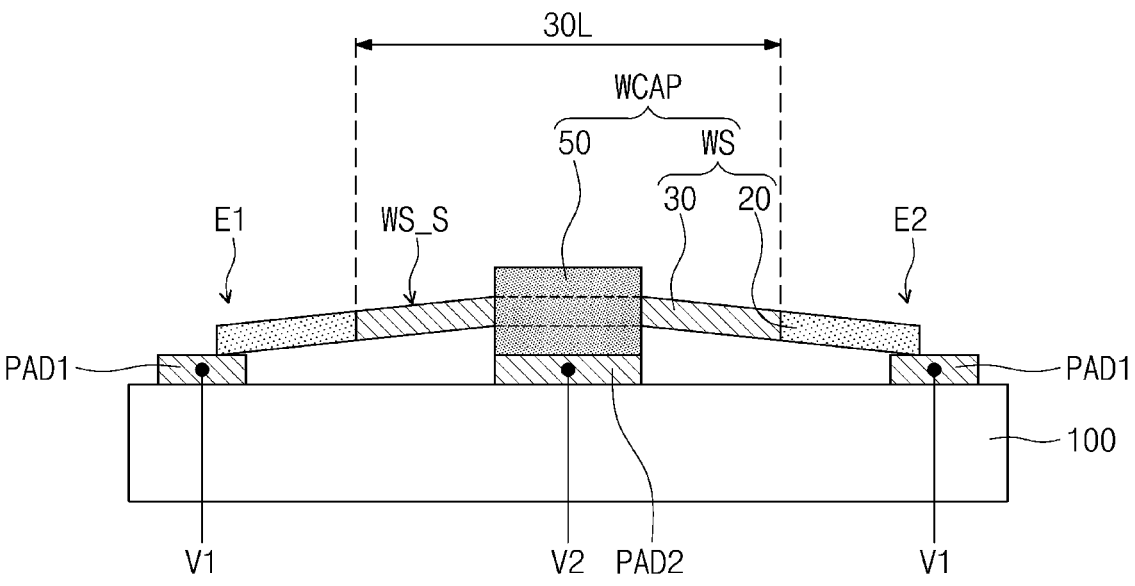

FIGS. 27 and 28 are conceptual diagrams of electronic devices including a wire capacitor according to embodiments of the inventive concept.

Referring to FIGS. 27 and 28, an electronic device may include a substrate 100, pads PAD1 and PAD2 disposed on one surface of the substrate 100, and a wire capacitor WCAP electrically connected to the pads PAD1 and PAD2. The wire capacitor WCAP may include a wire structure WS and a conductive layer 50 covering an outer surface WS_S of the wire structure WS. The electronic device may be, for example, a circuit board (e.g., module board, package substrate, etc.), or a chip substrate used in a semiconductor device (e.g., semiconductor package) or semiconductor module (e.g., memory module).

Referring to FIG. 27, according to some embodiments, the wire capacitor WCAP may be the wire capacitor WCAP described with reference to FIGS. 4 to 6, or 18 to 20. In this case, the outer surface of the wire structure WS may correspond to the outer surface 20S of the dielectric line 20 or the outer surface 40S of the passivation line 40.

The conductive layer 50 may expose a first end E1 and a second end E2 of the wire structure WS. According to some embodiments, the conductive layer 50 may function as an outer electrode of the wire capacitor WCAP. As a length of the conductive layer 50 50L (e.g., a length in a longitudinal direction LD) is adjusted, capacitance capacity of the wire capacitor WCAP may be adjusted.

The wire capacitor WCAP may be connected to the pads PAD1, PAD2. For example, one end of the core electrode line 10 may be connected to one of the first pads PAD1 by a ball bonding manner or wedge bonding manner, at the first end E1 of the wire structure WS. The other end of the core electrode line 10 may be connected to another one of the first pads PAD1 by a ball bonding manner or a wedge bonding manner, at the second end E2 of the wire structure WS. A first voltage V1 may be applied to the core electrode line 10 through at least one of the first pads PAD1.

The conductive layer 50 may be connected to the second pad PAD2. The conductive layer 50 may contact the second pad PAD2. The conductive layer 50 may function as an outer electrode of the wire capacitor WCAP, and a second voltage V2 may be applied to the conductive layer 50 through the second pad PAD2.

Referring to FIG. 28, according to other embodiments, the wire capacitor WCAP may be the wire capacitor WCAP described with reference to FIGS. 11 to 13, or 24 to 26. In this case, the outer surface of the wire structure WS may correspond to the outer surface 30S of the outer electrode line 30 or the outer surface 40S of the passivation line 40.

The outer electrode line 30 may expose the dielectric line 20 at the first end E1 and the second end E2 of the wire structure WS. As the length 30L (e.g., the length in the longitudinal direction LD) of the outer electrode line 30 is adjusted, the capacitance of the wire capacitor WCAP may be adjusted. The conductive layer 50 may be electrically connected to the outer electrode line 30.

The wire capacitor WCAP may be connected to the pads PAD1 and PAD2. For example, one end of the core electrode line 10 may be connected to one of the first pads PAD1 by a ball bonding manner or a wedge bonding manner, at the first end E1 of the wire structure WS. The other end of the core electrode line 10 may be connected to another one of the first pads PAD1 by a ball bonding manner or a wedge bonding manner, at the second end E2 of the wire structure WS. A first voltage V1 may be applied to the core electrode line 10 through at least one of the first pads PAD.

The conductive layer 50 may be connected to the second pad PAD2. The conductive layer 50 may contact the second pad PAD2. The outer electrode line 30 may be electrically connected to the second pad PAD2 through the conductive layer 50. A second voltage V2 may be applied to the outer electrode line 30 through the second pad PAD2 and the conductive layer 50.

FIGS. 29 to 33 are cross-sectional views of electronic devices including a wire capacitor according to embodiments of the inventive concept.

Figure 29:
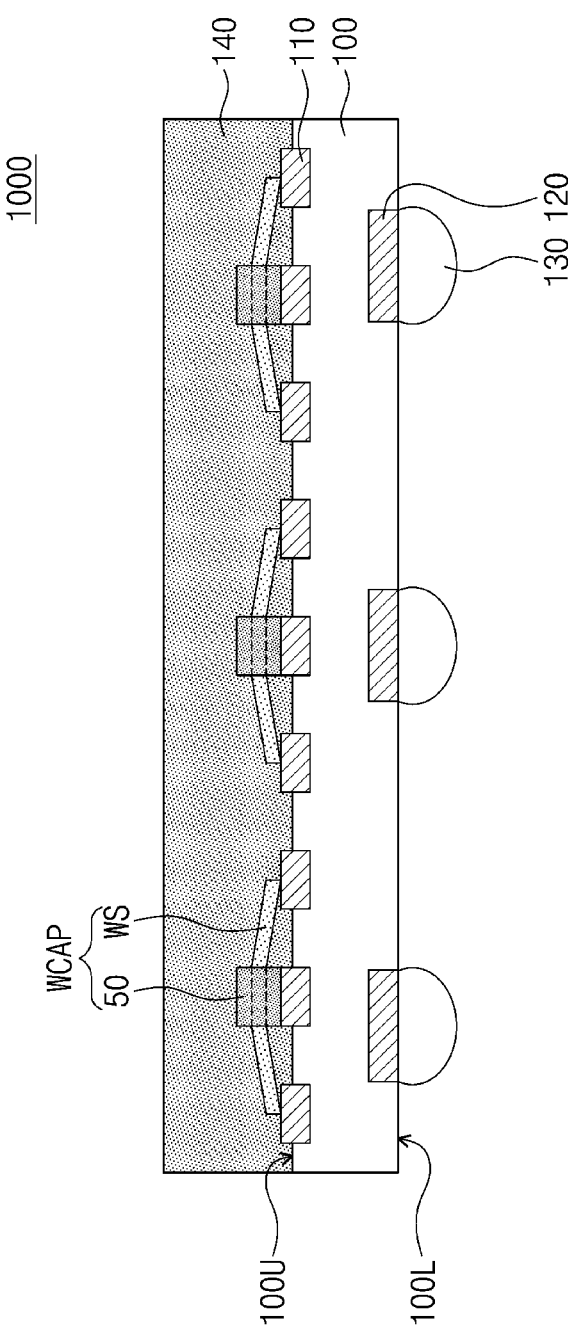

Referring to FIG. 29, an electronic device 1000 may include a package substrate 100, first substrate pads 110, second substrate pads 120, external connection terminals 130, a plurality of wire capacitors WCAP, and a chip mold layer 140.

The package substrate 100 may be a printed circuit board, an interposer substrate, or a redistribution substrate, and may include an upper surface 100U and a lower surface 100L opposite to each other. The first substrate pads 110 may be disposed on the upper surface 100U of the package substrate 100, and the second substrate pads 120 may be disposed on the lower surface 100L of the package substrate 100. The first substrate pads 110 may be electrically connected to the second substrate pads 120 through internal wirings in the package substrate 100. The first and second substrate pads

110 and 120 may include or be formed of a conductive material such as metal. The external connection terminals 130 may be disposed on the lower surface 100L of the package substrate 100, and may be disposed on each of the second substrate pads 120. The external connection terminals 130 may be electrically connected to the second substrate pads 120. The external connection terminals 130 may include at least one of a pillar, a bump, and a solder ball, and may include a conductive material.

The plurality of wire capacitors WCAP may be mounted on the upper surface 100U of the package substrate 100, and may be electrically connected to the first substrate pads 110. Each of the plurality of wire capacitors WCAP may include a wire structure WS and a conductive layer 50 covering a portion of the wire structure WS. Each of the plurality of wire capacitors WCAP may be one of the wire capacitors WCAP described with reference to FIGS. 4 to 6, 11 to 13, 18 to 20, and 24 to 26.

Each of the plurality of wire capacitors WCAP may be connected to a corresponding first substrate pad 110 among the first substrate pads 110. As an example, as described with reference to FIGS. 27 and 28, one end of the core electrode line 10 may be connected to one of the first substrate pads 110 by a ball bonding manner or a wedge bonding manner, at the first end E1 of the wire structure WS. The other end of the core electrode line 10 may be connected to another one of the first substrate pads 110 by a ball bonding manner or a wedge bonding manner, at the second end E2 of the wire structure WS. The conductive layer 50 may be connected to and may contact another one of the first substrate pads 110.

As an example, as described with reference to FIG. 27, the conductive layer 50 may function as an outer electrode of each of the plurality of wire capacitors WCAP. As another example, as described with reference to FIG. 28, the conductive layer 50 may electrically connect the outer electrode line 30 of each of the plurality of wire capacitors WCAP and one of the first substrate pads 110.

The chip mold layer 140 may be disposed on the upper surface 100U of the package substrate 100 and may seal the plurality of wire capacitors WCAP. The chip mold layer 140 may include an insulating material such as an epoxy molding compound, as an example.

The electronic device 1000 may be a chip capacitor including the plurality of wire capacitors WCAP mounted on the package substrate 100. The chip capacitor may refer to a capacitor in a form of a chip in which the plurality of wire capacitors WCAP are embedded. The electronic device 1100 may be electrically connected to an external terminal through the second substrate pads 120 and the external connection terminal 130 of the package substrate 100.

Figure 30:
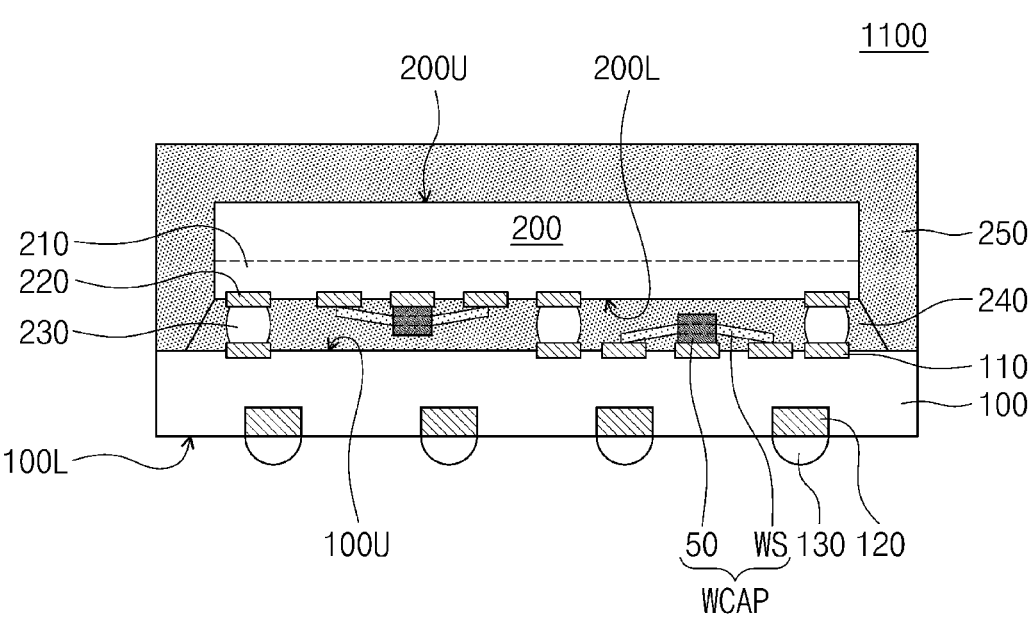

Referring to FIG. 30, an electronic device 1100 may include a package substrate 100, first substrate pads 110, second substrate pads 120, external connection terminals 130, a semiconductor chip 200, at least one wire capacitor WCAP, connection bumps 230, an underfill layer 240, and a chip mold layer 250.

The package substrate 100, the first substrate pads 110, the second substrate pads 120, and the external connection terminals 130 are the same as the package substrate 100, the first substrate pads 110, the second substrate pads 120, and the external connection terminals 130 described with reference to FIG. 29, respectively.

The semiconductor chip 200 may be mounted on an upper surface 100U of the package substrate 100. The semiconductor chip 200 may be a memory chip, a logic chip, an application processor (AP) chip, or a system on a chip (SOC) and may include an upper surface 200U and a lower surface 200L opposite to each other. The semiconductor chip 200 may include a circuit layer 210 adjacent to the lower surface 200L of the semiconductor chip 200 and chip pads 220 disposed on the lower surface 200L of the semiconductor chip 200. The chip pads 220 may be electrically connected to the circuit layer 210. The semiconductor chip 200 may be disposed so that the lower surface 200L of the semiconductor chip 200 faces the upper surface 100U of the package substrate 100.

The connection bumps 230 may be disposed between the semiconductor chip 200 and the package substrate 100 and may electrically connect the semiconductor chip 200 to the package substrate 100. The connection bumps 230 may be disposed on corresponding chip pads 220 among the chip pads 220, respectively, and may be electrically connected to each of the corresponding chip pads 220. The connection bumps 230 may be disposed on corresponding first substrate pads 110 among the first substrate pads 110, respectively, and may be electrically connected to each of the corresponding first substrate pads 110. The semiconductor chip 200 may be electrically connected to the package substrate 100 through the connection bumps 230, the corresponding chip pads 220, and the corresponding first substrate pads 110. The connection bumps 230 may include at least one of a pillar, a bump, and a solder ball, and may include a conductive material.

The at least one wire capacitor WCAP may include a wire structure WS and a conductive layer 50 covering a portion of the wire structure WS. The at least one wire capacitor WCAP may be one of the wire capacitors WCAP described with reference to FIGS. 4 to 6, 11 to 13, 18 to 20, and 24 to 26.

The at least one wire capacitor WCAP may be disposed between the semiconductor chip 200 and the package substrate 100. For example, the at least one wire capacitor WCAP may be disposed below the semiconductor chip 200 and may be connected to corresponding first substrate pads 110 among the first substrate pads 110. In another example, the at least one wire capacitor WCAP may be disposed on the lower surface 200L of the semiconductor chip 200 and may be connected to corresponding chip pads 220 among the chip pads 220. The at least one wire capacitor WCAP may be connected to the corresponding first substrate pads 110 or the corresponding chip pads 220 as described with reference to FIGS. 27 and 28.

The underfill layer 240 may fill the space between the semiconductor chip 200 and the package substrate 100, and may cover the connection bumps 230 and the at least one wire capacitor WCAP. The underfill layer 240 may include or be formed of an insulating polymer material such as an epoxy resin.

The chip mold layer 250 may be disposed on the upper surface 100U of the package substrate 100, and may seal the semiconductor chip 200. The chip mold layer 250 may cover the semiconductor chip 200 and the underfill layer 240, and may contact the upper surface 100U of the package substrate 100. The chip mold layer 250 may include or be formed of an insulating material such as an epoxy molding compound as an example.

The electronic device 1100 may be a semiconductor package including the semiconductor chip 200 and the at least one wire capacitor WCAP mounted on the package substrate 100.

Figure 31:
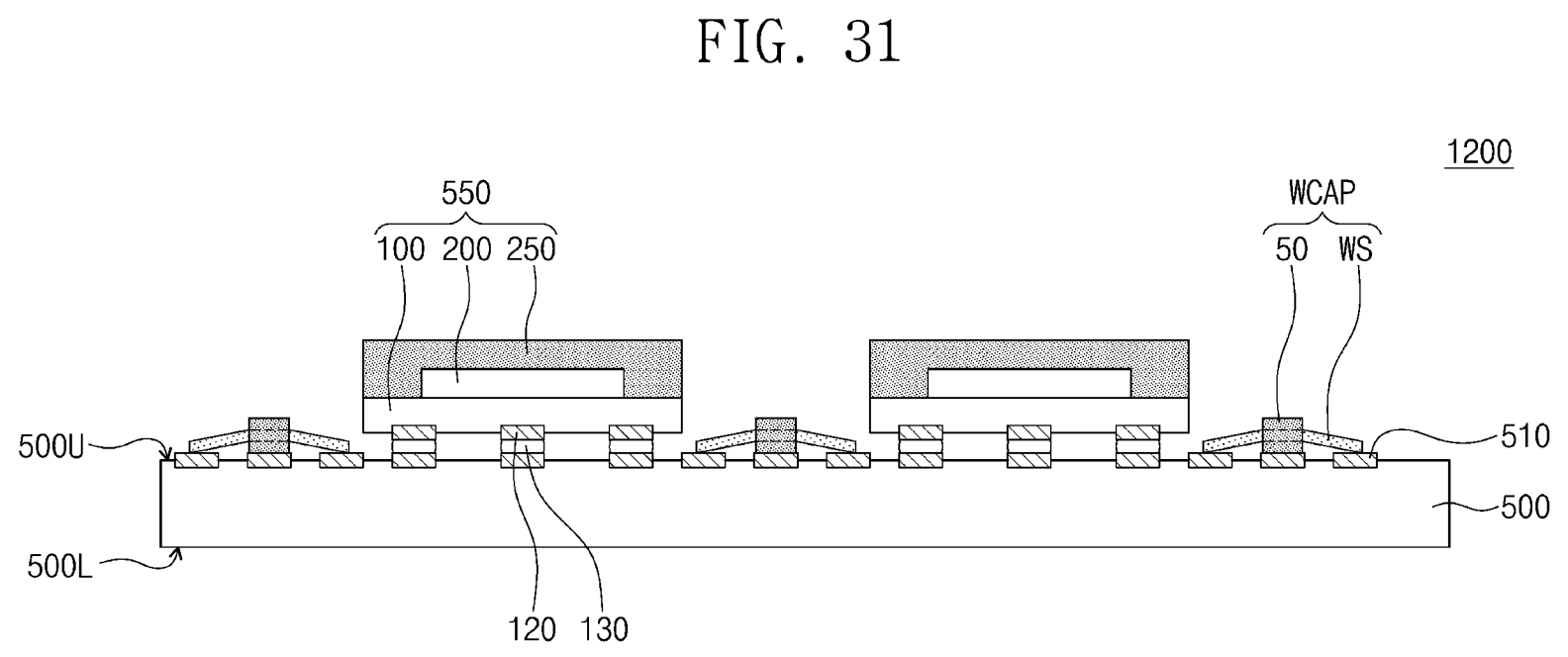

Referring to FIG. 31, an electronic device 1200 may include a module substrate 500, module substrate pads 510, semiconductor packages 550, and at least one wire capacitor WCAP.

The module substrate 500 may be a printed circuit substrate, and may have an upper surface 500U and a lower surface 500L opposite to each other. The module substrate pads 510 may be disposed on the upper surface 500U of the module substrate 500 and may be electrically connected to an internal wiring in the module substrate 500. The module substrate pads 510 may include or be formed of a conductive material such as a metal.

The semiconductor packages 550 may be disposed on the upper surface 500U of the module substrate 500 and may be horizontally spaced apart from each other. Each of the semiconductor packages 550 may include a package substrate 100, a semiconductor chip 200, and a chip mold layer 250. The package substrate 100, the semiconductor chip 200 and the chip mold layer 250 are the same as the package substrate 100, the semiconductor chip 200 and the chip mold layer 250 described with reference to FIG. 30, respectively. Each of the semiconductor packages 550 may have substantially the same configuration as those of the electronic device 1100 described with reference to FIG. 30. Substrate pads 120 may be disposed on the lower surface of the package substrate 100, and connection terminals 130 may be electrically connected to the substrate pads 120. The substrate pads 120 and the connection terminals 130 are substantially the same as the second substrate pads 120 and the external connection terminals 130 described with reference to FIG. 30, respectively. The connection terminals 130 may be electrically connected to corresponding module substrate pads 510 among the module substrate pads 510. Each of the semiconductor packages 550 may be electrically connected to the internal wiring within the module substrate 500 through the substrate pads 120, the connection terminals 130 and the corresponding module substrate pads 510. Each of the semiconductor chips 200 of the semiconductor packages 550 may be electrically connected to the internal wirings within the module substrate 500 through the package substrate 100, the substrate pads 120, the connection terminals 130, and the corresponding module substrate pads 510.

The at least one wire capacitor WCAP may include a wire structure WS, and a conductive layer 50 covering a portion of the wire structure WS. The at least one wire capacitor WCAP may be one of the wire capacitors WCAP described with reference to FIGS. 4 to 6, 11 to 13, 18 to 20, and 24 to 26. The at least one wire capacitor WCAP may be disposed on the upper surface 500U of the module substrate 500 and may be connected to corresponding module substrate pads 510 among the module substrate pads 510. The at least one wire capacitor WCAP may be horizontally spaced apart from the semiconductor packages 550 on the upper surface 500U of the module substrate 500. As described with reference to FIGS. 27 and 28, the at least one wire capacitor WCAP may be connected to the corresponding module substrate pads 510.

The electronic device 1200 may be a semiconductor module including the semiconductor packages 550 and the at least one wire capacitor WCAP mounted on the module substrate 500. Although not shown, the electronic device 1200 may further include an encapsulation layer disposed on the module substrate 500 and covering the semiconductor packages 550 and the at least one wire capacitor WCAP.

Figure 32:
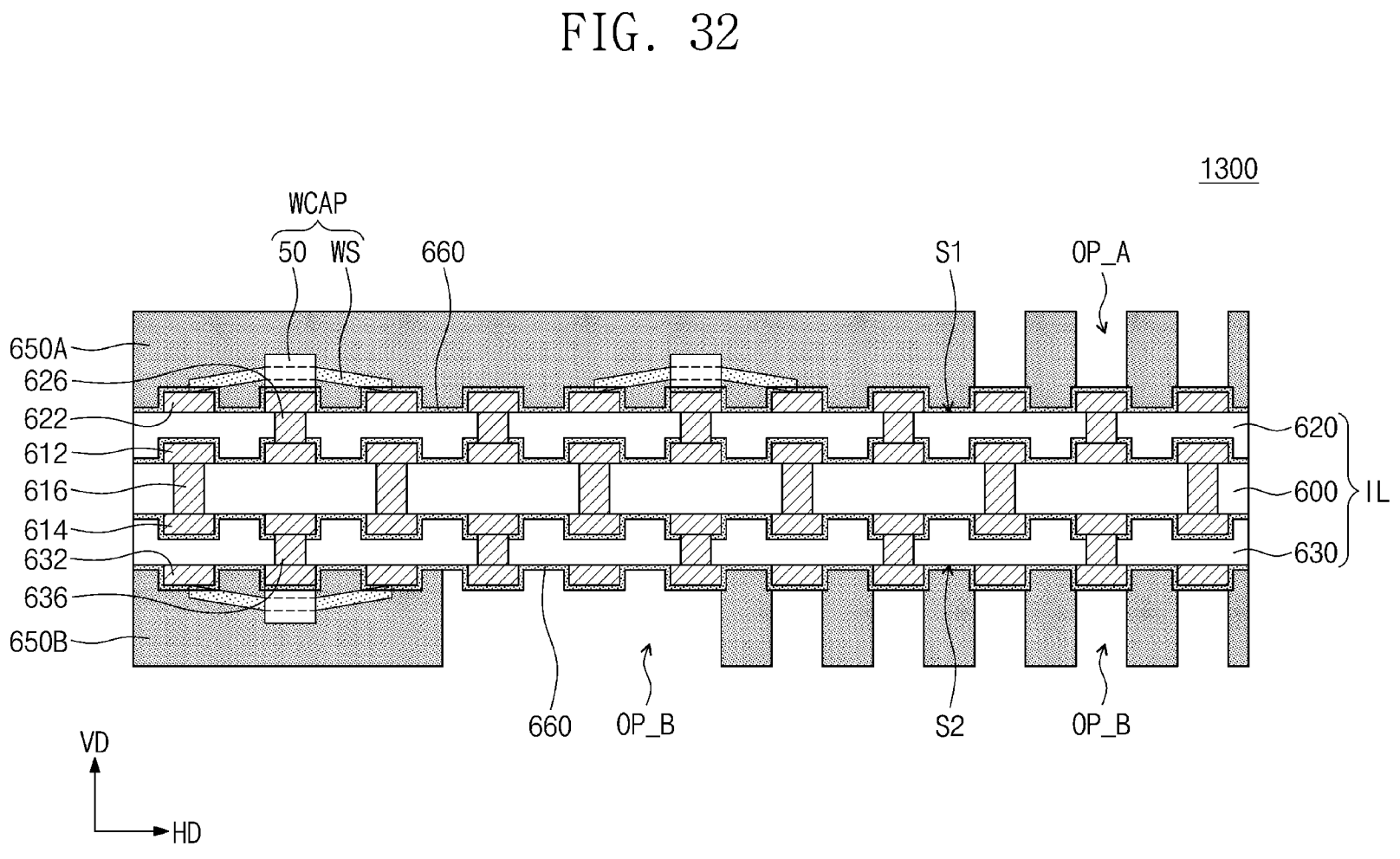

Referring to FIG. 32, an electronic device 1300 may include an insulating layer IL having a first surface S1 and a second surface S2 opposite to each other, upper wiring patterns 622 on the first surface S1 of the insulating layer IL, lower wiring patterns 632 on the second surface S2 of the insulating layer IL, and intermediate wiring patterns 612 and

614 disposed in the insulating layer IL and electrically connected to the upper wiring patterns 622 and the lower wiring patterns 632.

The insulating layer IL may include an upper insulating layer 620 adjacent to the first surface S1, a lower insulating layer 630 adjacent to the second surface S2, and an intermediate layer 600 between the upper insulating layer 620 and the lower insulating layer 630. Each of the upper insulating layer 620 and the lower insulating layer 630 may include an insulating polymer material and may further include glass fibers. According to some embodiments, the intermediate layer 600 may include a core substrate. The core substrate may include, for example, an insulating polymer material and may further include glass fibers. As another example, the core substrate may include metal (copper, aluminum, etc.). According to some embodiments, the intermediate layer 600 may include a plurality of intermediate insulating layers stacked in a vertical direction VD perpendicular to the first surface S1 between the upper insulating layer 620 and the lower insulating layer 630, and the core substrate interposed between the plurality of intermediate insulating layers. In this case, each of the plurality of intermediate insulating layers may include an insulating polymer material and may further include glass fibers.

The upper wiring patterns 622 may be disposed on the first surface S1 of the insulating layer IL and on the upper insulating layer 620. The upper wiring patterns 622 may include or be formed of metal (e.g., copper). The lower wiring patterns 632 may be disposed on the second surface S2 of the insulating layer IL and on the lower insulating layer 630. The lower wiring patterns 632 may include or be formed of metal (e.g., copper). The intermediate wiring patterns 612 and 614 may include first intermediate wiring patterns 612 disposed between the intermediate layer 600 and the upper insulating layer 620 and second intermediate wiring patterns 614 disposed between the intermediate layer 600 and the lower insulating layer 630. The intermediate wiring patterns 612 and 614 may include or be formed of metal (e.g., copper).

The electronic device 1300 may further include upper vias 626 disposed in the upper insulating layer 620 and electrically connecting the upper wiring patterns 622 and the first intermediate wiring patterns 612, lower vias 636 disposed in the lower insulating layer 630 and electrically connecting the lower wiring patterns 632 and the second intermediate wiring patterns 614, and intermediate vias 616 disposed in the intermediate layer 600 and electrically connecting the first intermediate wiring patterns 612 and the second intermediate wiring patterns 614 to each other. The electronic device 1300 may further include additional intermediate wiring patterns disposed in the intermediate layer 600, and additional intermediate vias electrically connecting the additional intermediate wiring patterns to each other. The upper vias 626, the lower vias 636, and the intermediate vias 616 may include or be formed of metal (e.g., copper).

The electronic device 1300 may further include a wire capacitor WCAP electrically connected to corresponding wiring patterns 622, 632, 612, and 614 among the upper wiring patterns 622, the lower wiring patterns 632, and the intermediate wiring patterns 612 and 614. The wire capacitor WCAP may include a wire structure WS and a conductive layer 50 covering a portion of the wire structure WS. The wire capacitor WCAP may be one of the wire capacitors WCAP described with reference to FIGS. 4 to 6, 11 to 13, 18 to 20, and 24 to 26.

As described with reference to FIGS. 27 and 28, the wire capacitor WCAP may be connected to the corresponding wiring patterns 622, 632, 612, and 614. For example, the wire capacitor WCAP may be disposed on the first surface S1 of the insulating layer IL, and may be connected to corresponding upper wiring patterns 622 among the upper wiring patterns 622. The wire capacitor WCAP may be connected to the corresponding upper wiring patterns 622 in the same manner as described with reference to FIGS. 27 and 28. As another example, the wire capacitor WCAP may be disposed on the second surface S2 of the insulating layer IL, and may be connected to corresponding lower wiring patterns 632 among the lower wiring patterns 632. The wire capacitor WCAP may be connected to the corresponding lower wiring patterns 632 in the same manner as described with reference to FIGS. 27 and 28.

The electronic device 1300 may further include an upper mask layer 650A disposed on the first surface S1 of the insulating layer IL and covering the upper wiring patterns 622 and a lower mask layer 650B disposed on the second surface S2 of the insulating layer IL and covering the lower wiring patterns 632. Each of the upper mask layer 650A and the lower mask layer 650B may be a solder mask or a solder resist and may include an insulating material. The wire capacitor WCAP connected to the corresponding upper wiring patterns 622 may be disposed inside the upper mask layer 650A, and the wire capacitor WCAP connected to the corresponding lower wiring patterns 632 may be disposed inside the lower mask layer 650B.

The electronic device 1300 may further include a protective layer 660 covering surfaces of the upper wiring patterns 622, the lower wiring patterns 632, and the intermediate wiring patterns 612 and 614. The protective layer 660 may include a metal oxide (e.g., aluminum oxide), and may prevent surfaces of the upper wiring patterns 622, the lower wiring patterns 632, and the intermediate wiring patterns 612 and 614 from being oxidized.

The protective layer 660 covering surfaces of the upper wiring patterns 622 may be interposed between the upper wiring patterns 622 and the upper mask layer 650A, and may extend between the upper insulating layer 620 and the upper mask layer 650A. The wire capacitor WCAP may pass through the protective layer 660 and may be connected to the corresponding upper wiring patterns 622. The protective layer 660 covering surfaces of the lower wiring patterns 632 may be interposed between the lower wiring patterns 632 and the lower mask layer 650B and may extend between the lower insulating layer 630 and the lower mask layer 650B. The wire capacitor WCAP may pass through the protective layer 660 and be connected to the corresponding lower wiring patterns 632. According to some embodiments, the protective layer 660 may be omitted.

The upper mask layer 650A may include upper openings OP_A. The upper openings OP_A may vertically overlap (e.g., in the vertical direction VD) with corresponding upper wiring patterns 622 among the upper wiring patterns 622 and may expose the protective layer 660 on the corresponding upper wiring patterns 622. The lower mask layer 650B may include lower openings OP_B. The lower openings OP_B may vertically overlap corresponding lower wiring patterns 632 among the lower wiring patterns 632 (e.g., in the vertical direction VD) and may expose the protective layer 660 on the corresponding lower wiring patterns 632. According to some embodiments, the protective layer 160 may be omitted, and in this case, the upper openings OP_A may expose the corresponding upper wiring patterns 622, and the lower openings OP_B may expose the corresponding lower wiring patterns 632.

The electronic device 1300 may be a wiring substrate where the wire capacitor WCAP is embedded, and may be, for example, an embedded printed circuit board.

Figure 33:
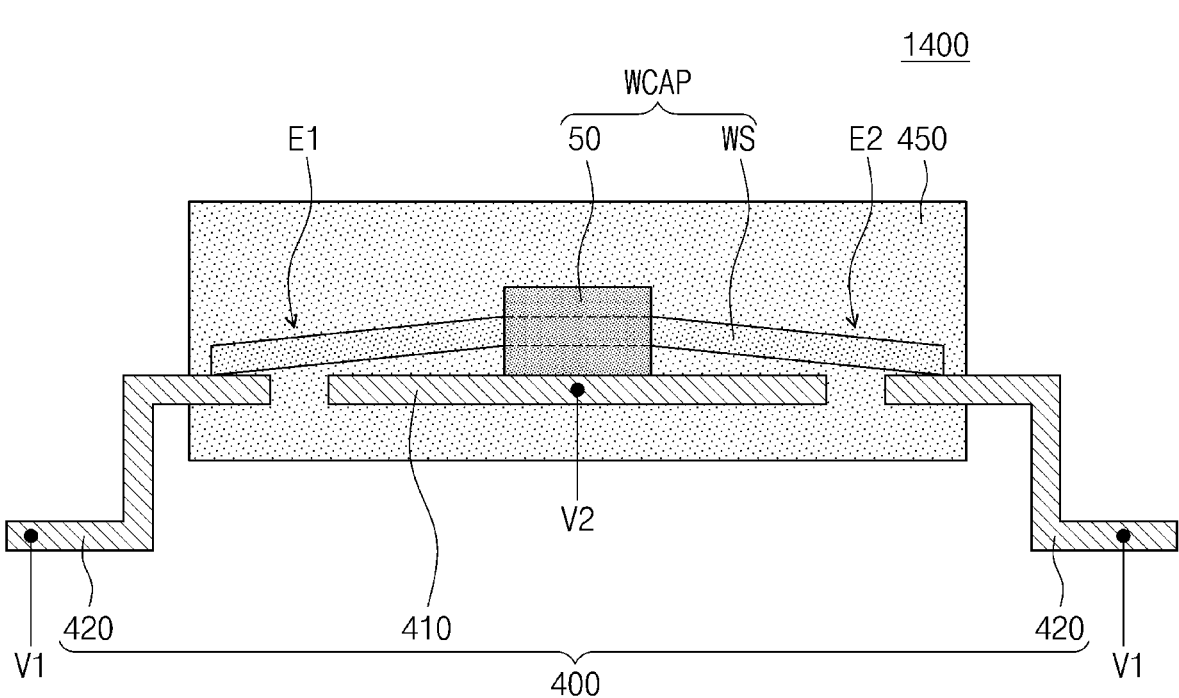

Referring to FIG. 33, an electronic device 1400 may include a lead frame 400, a wire capacitor WCAP mounted on the lead frame 400, and a mold layer 450.

The lead frame 400 may include a support substrate 410 and a plurality of leads 420. The support substrate 410 and the plurality of leads 420 may include or be formed of a metal material.

The wire capacitor WCAP may be electrically connected to the support substrate 410 and the plurality of leads 420. The wire capacitor WCAP may include a wire structure WS and a conductive layer 50 covering the wire structure WS. The conductive layer 50 may expose a first end E1 and a second end E2 of the wire structure WS. Similar to that described with reference to FIGS. 27 and 28, one end of the core electrode line 10 may be connected to one of the plurality of leads 420 by a ball bonding manner or wedge bonding manner, at the first end E1 of the wire structure WS. The other end of the core electrode line 10 may be connected to another one of the plurality of leads 420 by a ball bonding manner or a wedge bonding manner, at the second end E2 of the wire structure WS. A first voltage V1 may be applied to the core electrode line 10 through at least one of the plurality of leads 420.

The conductive layer 50 may be connected to the support substrate 410 and may contact the support substrate 410. According to some embodiments, similar to that described with reference to FIG. 27, the conductive layer 50 may function as an outer electrode of the wire capacitor WCAP, and a second voltage V2 may be applied to the conductive layer 50 through the support substrate 410. According to other embodiments, similar to that described with reference to FIG. 28, the outer electrode line 30 of the wire capacitor WCAP may be electrically connected to the support substrate 410 through the conductive layer 50. The second voltage V2 may be applied to the outer electrode line 30 through the support substrate 410 and the conductive layer 50.

The mold layer 450 may seal the support substrate 410 and the wire capacitor WCAP, and may cover ends of the plurality of leads 420. Other ends of the plurality of leads 420 may be exposed to the outside of the mold layer 450 and may be connected to external terminals.

The electronic device 1700 may be a chip capacitor or a semiconductor package including the wire capacitor WCAP mounted on the lead frame 400.

According to aspects of the inventive concept, the wire structure WS of the wire capacitor WCAP may be connected to pads or leads by a wire bonding manner. As the wire structure WS has a wire shape, the wire capacitor WCAP may be easily miniaturized, and may be easily bent to fit within particular spaces. In addition, as the wire structure WS is connected to the pads or the leads by a wire bonding manner, the wire capacitor WCAP may be easily mounted in the electronic device. Accordingly, miniaturization and high integration of the electronic device may be facilitated.

In addition, the length of the conductive layer 50 or the outer electrode line 30 of the wire capacitor WCAP may be adjusted. Accordingly, the capacitance capacity of the wire capacitor WCAP may be adjusted. Thus, the electronic device with the wire capacitor having the required capacitance may be easily provided.

According to aspects of the inventive concept, the wire capacitor may include the wire structure having the wire shape, and the conductive layer that covers the outer surface of the wire structure. The wire structure may be connected to the leads of the pads or the leads of the lead frames on the substrate by the wire bonding manner. As the wire structure has the wire shape, the wire capacitor may be easy to be miniaturized. In addition, as the wire structure is connected by the wire bonding manner to the pads or the leads, the wire capacitor may be easily mounted in the electronic device. In addition, the length of the outer electrode line or the conductive layer of the wire structure may be adjusted, thereby adjusting the capacitance of the wire capacitor.

Thus, the wire capacitor that is easy to be miniaturized and mounted and is capable of adjusting the capacitance may be provided, and the electronic device may be easy to be miniaturized and integrated.

While embodiments are described above, a person skilled in the art may understand that many modifications and variations are made without departing from the spirit and scope of the invention defined in the following claims. Accordingly, the example embodiments of the inventive concept should be considered in all respects as illustrative and not restrictive, with the spirit and scope of the invention being indicated by the appended claims.

What is claimed is:

1. A wire capacitor comprising:
a wire structure extending in a longitudinal direction; and
a conductive layer covering an outer surface of the wire structure,
wherein the wire structure includes:
a core electrode line having a wire shape and extending in the longitudinal direction; and
a dielectric line surrounding an outer surface of the core electrode line and extending in the longitudinal direction,
wherein the wire structure has a first end and a second end which are opposite to each other in the longitudinal direction,
wherein the conductive layer exposes an outer circumference of the first end and the second end of the wire structure,
wherein the conductive layer is configured to be connected to a first pad of a substrate associated with a semiconductor device, and
wherein the first end of the wire structure is configured to be bonded to a second pad of the substrate.

2. The wire capacitor of claim 1, wherein the conductive layer includes conductive paste.

3. The wire capacitor of claim 1, wherein the conductive layer covers an outer surface of the dielectric line and contacts the dielectric line.

4. The wire capacitor of claim 1, wherein the wire structure further includes a passivation line surrounding an outer surface of the dielectric line and extending in the longitudinal direction, and
wherein the conductive layer covers an outer surface of the passivation line and contacts the passivation line.

5. The wire capacitor of claim 1, wherein the wire structure further includes an outer electrode line surrounding an outer surface of the dielectric line and extending in the longitudinal direction,
wherein the outer electrode line exposes an outer circumference of the dielectric line, at the first end and the second end of the wire structure, and
wherein the conductive layer covers an outer surface of the outer electrode line.

6. The wire capacitor of claim 5, wherein the conductive layer contacts the outer electrode line.

7. The wire capacitor of claim 5, wherein the wire structure further includes a passivation line surrounding an outer surface of the outer electrode line and extending in the longitudinal direction, wherein the passivation line exposes an outer circumference of the dielectric line, at the first end and the second end of the wire structure, and wherein the conductive layer is connected to the outer electrode line penetrating through the passivation line.

8. The wire capacitor of claim 7, wherein the conductive layer contacts the outer electrode line.

9. The wire capacitor of claim 1, wherein the wire structure further includes an adhesive layer interposed between the core electrode line and the dielectric line.

10. The wire capacitor of claim 5, wherein:

the second end of the wire structure is configured to be bonded to a third pad of the substrate.

11. An electronic device comprising:

a substrate; and a wire capacitor electrically connected to the substrate, wherein the wire capacitor includes:

a wire structure extending in a longitudinal direction; and a conductive layer covering an outer surface of the wire structure, wherein the wire structure includes:

a core electrode line having a wire shape and extending in the longitudinal direction; and a dielectric line surrounding an outer surface of the core electrode line and extending in the longitudinal direction, wherein the wire structure includes a first end and a second end opposite to each other in the longitudinal direction, wherein the conductive layer exposes an outer circumference the first end and the second end of the wire structure, wherein the core electrode line is connected to the substrate by a wire bonding manner, at at least one of the first end and the second end of the wire structure, and wherein the conductive layer is electrically connected to the substrate.

12. The electronic device of claim 11, wherein the core electrode line is connected to the substrate by a ball bonding manner or a wedge bonding manner, at at least one of the first end and the second end of the wire structure.

13. The electronic device of claim 11, wherein the substrate includes pads on an upper surface of the substrate, and wherein ends of the core electrode line are connected to a pair of first pads of the pads using a ball bonding manner or a wedge bonding manner, respectively, at the first end and the second end of the wire structure.

14. The electronic device of claim 13, wherein the conductive layer is connected to a second pad of the pads.

15. The electronic device of claim 14, wherein the conductive layer includes a conductive paste.

16. The electronic device of claim 11, wherein the wire structure further includes an outer electrode line surrounding an outer surface of the dielectric line and extending in the longitudinal direction, wherein the outer electrode line exposes an outer circumference of the dielectric line, at the first end and the second end of the wire structure, and wherein the conductive layer covers an outer surface of the outer electrode line, and the outer electrode line is electrically connected to the substrate through the conductive layer.

17. The electronic device of claim 11, wherein the substrate is a semiconductor chip, a redistribution substrate, a printed circuit board, or a lead frame.

18. A wire capacitor for use in a semiconductor device or semiconductor module, the wire capacitor comprising:

a wire structure extending in a longitudinal direction; and a conductive layer covering an outer surface of the wire structure, wherein the wire structure includes:

a core electrode line having a wire shape and extending in the longitudinal direction; and a dielectric line surrounding an outer surface of the core electrode line and extending in the longitudinal direction, wherein the wire structure has a first end and a second end which are opposite to each other in the longitudinal direction, wherein the conductive layer exposes an outer circumference of the first end and the second end of the wire structure, wherein the conductive layer is configured to be connected to a pad of a substrate, and wherein the first end and the second end of the wire structure each are configured to be bonded to a pad of the substrate.

19. The wire capacitor of claim 18, wherein the dielectric line includes a material contacting the core electrode line and formed using physical vapor deposition, chemical vapor deposition, or atomic layer deposition.

\* \* \* \* \*